(12) United States Patent
Tada

(10) Patent No.: US 11,405,528 B2
(45) Date of Patent: Aug. 2, 2022

(54) INFORMATION PROCESSING DEVICE AND INFORMATION PROCESSING METHOD FOR AVOIDING LEAKAGE OF INFORMATION

(71) Applicant: FeliCa Networks, Inc., Tokyo (JP)

(72) Inventor: Jun Tada, Tokyo (JP)

(73) Assignee: FELICA NETWORKS, INC., Tokyo (JP)

( * ) Notice: Subject to any disclaimer, the term of this patent is extended or adjusted under 35 U.S.C. 154(b) by 0 days.

(21) Appl. No.: 17/051,621

(22) PCT Filed: Mar. 26, 2019

(86) PCT No.: PCT/JP2019/012640
§ 371 (c)(1),
(2) Date: Oct. 29, 2020

(87) PCT Pub. No.: WO2019/225142
PCT Pub. Date: Nov. 28, 2019

(65) Prior Publication Data
US 2021/0227094 A1   Jul. 22, 2021

(30) Foreign Application Priority Data

May 23, 2018  (JP) .............................. JP2018-098551

(51) Int. Cl.
*H04N 1/44* (2006.01)
*G06F 21/62* (2013.01)
(Continued)

(52) U.S. Cl.
CPC ....... *H04N 1/4493* (2013.01); *G06F 21/6245* (2013.01); *G06V 10/235* (2022.01);
(Continued)

(58) Field of Classification Search
CPC ... H04N 1/4493; G06F 21/6245; G06F 21/62; G06K 9/00442; G06K 9/2081;
(Continued)

(56) References Cited

U.S. PATENT DOCUMENTS 9,788,179 B1   10/2017  Sharifi et al.
2011/0225031 A1   9/2011  Park
(Continued)

FOREIGN PATENT DOCUMENTS

CN   107430761 A   12/2017
CN   107516050 A   12/2017
(Continued)

*Primary Examiner* — Christopher Wait
(74) *Attorney, Agent, or Firm* — Paratus Law Group, PLLC

(57) ABSTRACT

An information processing device and an information processing method capable of effectively implementing sales promotion measures for promoting product purchase via an EC company while avoiding leakage of personal information are provided. The information processing device includes a processing unit that performs mask processing or mosaic processing on a predetermined area of a captured image acquired by capturing at least one of a purchase history, a delivery statement, and an email provided to a user by at least one electronic commerce company, and a determination unit that determines whether the captured image that has been processed includes predetermined information.

18 Claims, 13 Drawing Sheets

(51) Int. Cl.
*G06V 10/22* (2022.01)
*G06V 30/40* (2022.01)
*G06Q 30/00* (2012.01)
*G06V 30/10* (2022.01)

(52) U.S. Cl.
CPC ............ *G06V 30/40* (2022.01); *G06Q 30/01* (2013.01); *G06V 30/10* (2022.01)

(58) Field of Classification Search
CPC .............. G06K 2209/01; G06Q 30/01; G06Q 30/0224; G06Q 30/02; G06Q 30/06
See application file for complete search history.

(56) References Cited

U.S. PATENT DOCUMENTS

| | | |
|---|---|---|
| 2013/0103462 A1 | 4/2013 | Carpenter et al. |
| 2013/0103471 A1 | 4/2013 | Carpenter et al. |
| 2013/0103473 A1 | 4/2013 | Carpenter et al. |
| 2013/0103475 A1 | 4/2013 | Carpenter et al. |
| 2013/0103476 A1 | 4/2013 | Carpenter et al. |
| 2013/0103481 A1 | 4/2013 | Carpenter et al. |
| 2015/0227785 A1 | 8/2015 | Wada et al. |
| 2015/0332439 A1* | 11/2015 | Zhang ................. G06F 21/6254 345/647 |
| 2020/0126032 A1* | 4/2020 | Gao ..................... G06K 7/1417 |

FOREIGN PATENT DOCUMENTS

| | | | |
|---|---|---|---|
| EP | 2945098 A1 | | 11/2015 |
| JP | 2004-295326 A | | 10/2004 |
| JP | 2004295326 A | * | 10/2004 |
| JP | 2010-079877 A | | 4/2010 |
| JP | 2010-204861 A | | 9/2010 |
| JP | 2014-038561 A | | 2/2014 |
| JP | 2014-044620 A | | 3/2014 |
| JP | 2014-186726 A | | 10/2014 |
| JP | 2016-126761 A | | 7/2016 |
| JP | 2016-167306 A | | 9/2016 |
| KR | 10-2010-0049894 A | | 5/2010 |
| WO | WO 2010/053268 A2 | | 5/2010 |
| WO | WO 2014/030266 A1 | | 2/2014 |

* cited by examiner

<SET INCENTIVE PROVIDING CONDITION>   CAMPAIGN ID: XXXX

- TARGET PERIOD FOR EC ORDER: APRIL 1, 2018 TO MAY 13, 2018
- PURCHASE TARGET PRODUCT MANUFACTURER: FN CHOCOLATE COMPANY   PRODUCT NAME: FN CHOCOLATE
- PURCHASE TARGET PRODUCT (JAN CODE): XXXXXX (A PLURALITY OF PRODUCTS CAN BE SPECIFIED)
- APPLICATION CONDITIONS: ONE TIME PER PERSON
- UPPER LIMIT OF FIRST ARRIVALS: UP TO 3000 FIRST ARRIVALS
- WINNING POINT: 100 POINTS
- TARGET EC COMPANY : ☑ FN-SHOP  ☑ S-Shop  ☐ BB!

SPECIFICATION OF ACQUIRED DATA (FN-Shop)

<STATUS CONDITION>
○ PURCHASE FROM EC   ○ SHIPPING COMPLETED   ○ DELIVERY COMPLETED   ● PAYMENT COMPLETED

<ACQUIRED DATA>
- ORDER DATE, TOTAL AMOUNT OF MONEY, ORDER NUMBER (17 DIGITS)

<PERSONAL INFORMATION DATA ON WHICH IMAGE MASKING IS PERFORMED>
- NAME, ADDRESS, CARD INFORMATION, TEL

SPECIFICATION OF ACQUIRED DATA (S-Shop)

<STATUS CONDITION>
○ PURCHASE FROM EC   ● SHIPPING COMPLETED   ○ DELIVERY COMPLETED   ○ PAYMENT COMPLETED

<ACQUIRED DATA>
- PURCHASE DATE, ORDER NUMBER (22 DIGITS), PACKAGE NUMBER

<PERSONAL INFORMATION DATA ON WHICH IMAGE MASKING IS PERFORMED>
- NAME, ADDRESS, TEL, PAYMENT INFORMATION

FN-Shop

0 point                                taro-t22

DETAILS OF ORDER HISTORY

PAYMENT WITH CREDIT CARD IS COMPLETED.

ORDER DATE AND TIME  17:54 ON MAY 1, 2018
ORDER NUMBER            XXXXXX-AAAAAAAA-BBB
TOTAL AMOUNT OF MONEY  5000 YEN
                       (DELIVERY CHARGE INCLUDED)

DELIVERY ADDRESS
HANAKO SUZUKI
BBX-X-X SHINAGAWA-KU, TOKYO
PACKAGE NUMBER: FN DELIVERY BBBBCCCCDDDD

CONTENTS OF ORDER
MOTHER'S DAY GIFT

INFORMATION PROCESSING DEVICE AND INFORMATION PROCESSING METHOD FOR AVOIDING LEAKAGE OF INFORMATION

CROSS REFERENCE TO PRIOR APPLICATION

This application is a National Stage Patent Application of PCT International Patent Application No. PCT/JP2019/012640 (filed on Mar. 26, 2019) under 35 U.S.C. § 371, which claims priority to Japanese Patent Application No. 2018-098551 (filed on May 23, 2018), which are all hereby incorporated by reference in their entirety.

FIELD

The present disclosure relates to an information processing device and an information processing method.

BACKGROUND

In recent years, companies that manufacture, sell, and perform other actions on products etc. have implemented various forms of sales promotion measures in order to promote the sales of products and the like. Such sales promotion measures include, for example, providing points, discount coupons, and the like that can be used for electronic payment for users who have been confirmed by the companies to have purchased a predetermined product based on the acquired purchase histories. In addition, an example of a method of acquiring and managing users and purchase histories of the users in association (for example, the information printed on receipts provided to the users upon purchases at actual shops) may be the technique disclosed in Patent Literatures 1 or 2 below.

Further, in recent years, many users increasingly purchase products from an electronic commerce (EC) companies (electronic commerce companies) rather than from actual shops. In such a case, information for the companies to determine whether a user has purchased a predetermined product can be acquired by asking the user to capture an image of a page of a purchase history or the like provided by the EC company (for example, provided on a website or application), and send the captured image to the company. As a method for making a determination using a captured image, there is a technique disclosed in Patent Literature 3 below.

CITATION LIST

Patent Literature

Patent Literature 1: JP 2004-295326 A
Patent Literature 2: JP 2016-126761 A
Patent Literature 3: JP 2010-79877 A

SUMMARY

Technical Problem

However, a captured and sent purchase history image often includes personal information such as a name and an address of a user, and identification information used between the user and the EC company in addition to the information for determining whether the user has purchased the predetermined product. Therefore, in implementing sales promotion measures using purchase histories provided by an EC company, companies are required to strictly manage the handling of personal information, which has been an obstacle to implementation of sales promotion measures described above.

Therefore, according to the present disclosure, in view of the above-described circumstances, a novel and improved information processing device and an information processing method capable of effectively implementing sales promotion measures for promoting product purchase via an EC company while avoiding leakage of personal information is proposed.

Solution to Problem

According to the present disclosure, an information processing device is provided. The information processing device includes a processing unit that performs mask processing or mosaic processing on a predetermined area of a captured image acquired by capturing at least one of a purchase history, a delivery statement, and an email provided to a user by at least one electronic commerce company, and a determination unit that determines whether the captured image that has been processed includes predetermined information.

Moreover, according to an information processing method is provided. The information processing method includes performing mask processing or mosaic processing on a predetermined area of a captured image acquired by capturing at least one of a purchase history, a delivery statement, and an email provided to a user by at least one electronic commerce company, and determining whether the captured image that has been processed includes predetermined information.

Advantageous Effects of Invention

As described above, according to the present disclosure, it is possible to effectively implement sales promotion measures for promoting product purchase via an EC company while avoiding leakage of personal information.

Note that the effects are not necessarily limited to those described above, and any effect described in the present description or other effects that can be grasped from the present description may be exerted together with or in place of the above-described effects.

BRIEF DESCRIPTION OF DRAWINGS

FIG. 6 is an explanatory diagram illustrating an example of a setting screen 500 according to the embodiment of the present disclosure.

FIG. 11 is an explanatory diagram illustrating an example of a captured image 600b according to the embodiment of the present disclosure.

DESCRIPTION OF EMBODIMENTS

Figure 1:
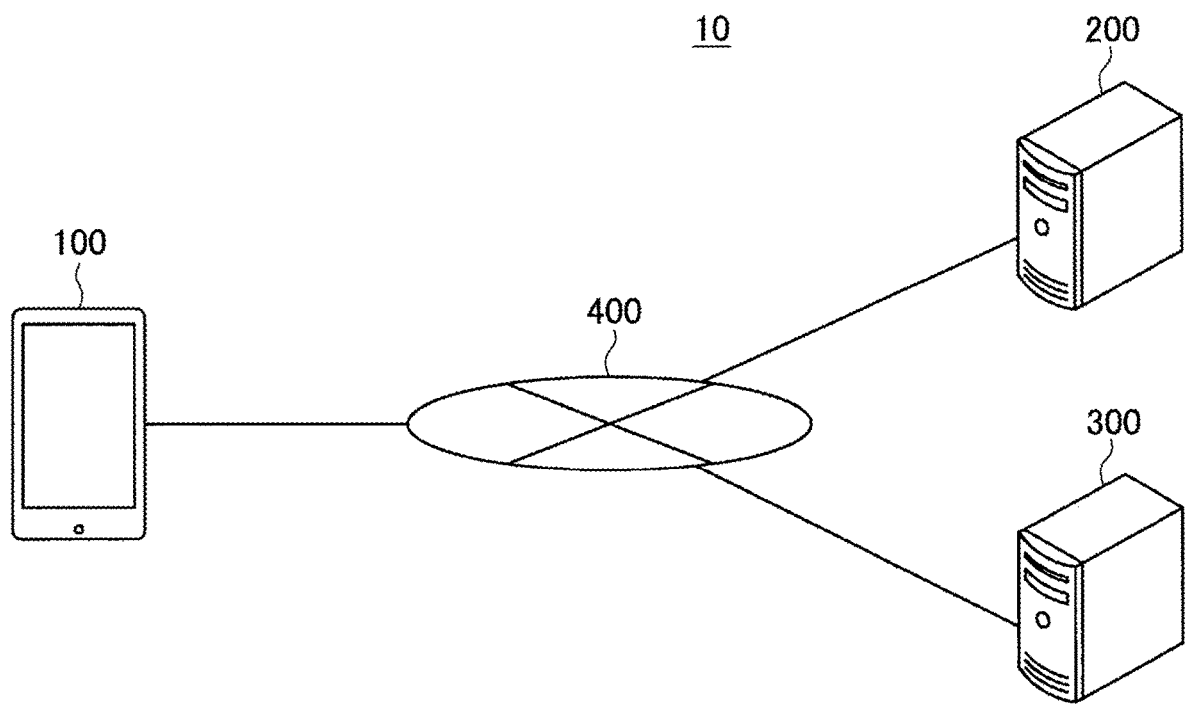
FIG. 1 is a system diagram illustrating a schematic configuration of an information processing system 10 according to an embodiment of the present disclosure.

Hereinafter, preferred embodiments of the present disclosure will be described in detail with reference to the accompanying drawings. In the present description and the drawings, components having substantially the same functional configuration will be denoted with the same reference numerals and redundant description will be omitted.

Furthermore, in this description and the drawings, a plurality of components having substantially the same functional or similar configurations will be distinguished by giving the same reference numeral followed by different alphabets in some cases. However, when it is unnecessary to particularly distinguish each of the plurality of components having substantially the same or similar functional configurations, only the same reference numeral is assigned.

Note that the description will be given in the following order.
1. Background to creation of embodiments according to present disclosure
2. Embodiments of the present disclosure
2.1 Schematic configuration of information processing system 10
2.2 Detailed configuration of user terminal 100
2.3 Detailed configuration of determination server 200
2.4 Detailed configuration of EC company server 300
2.5 Information processing method
2.5.1 Outline of information processing method
2.5.2 Purchase stage
2.5.3 Application stage
2.5.4 Incentive providing stage
3. Conclusion
4. Hardware Configuration
5. Supplement 1. Background to Creation of Embodiments According to Present Disclosure First, before describing embodiments according to the present disclosure in detail, a description will be given of a background to creation of the embodiments according to the present disclosure by the inventor.

The present inventor has repeatedly studied the sales promotion measures as described above. Here, sales promotion measures implemented by a company include, for example, providing an incentive such as points or discount coupons that can be used for electronic payment for users who have been confirmed to have purchased a predetermined product based on the purchase histories of the users.

For example, in a case where a user purchases a product from an EC company, information for the companies to determine whether a user has purchased a predetermined product can be acquired by asking the user to capture an image of a page of a purchase history or the like provided by the EC company, and send the captured image to the company. The company then determines whether the user has purchased a predetermined number of predetermined products or predetermined products for a predetermined amount of money during a predetermined period based on the acquired information, and the company provides an incentive to the user when the conditions are satisfied. Providing an incentive increases the motivation of the user to purchase the product, which leads to sales promotion of the product. In addition, for the company side, in addition to promotion of product sales, but also more effective marketing becomes possible because information about product sales in various channels (actual shops, EC company, etc.) can be collected.

However, as described above, a captured and sent purchase history image often includes personal information of a user (a name, an address, identification information used between the user and the EC company, and the like) in addition to the information for determining whether the user has purchased the predetermined product. Therefore, in implementing purchase promotion measures using purchase histories provided by an EC company, companies are required to strictly manage the handling of personal information, which has been an obstacle to implementation of sales promotion measures described above.

Furthermore, it is conceivable that a user modifies the captured image such that personal information is not leaked, but in this case, the user is required to have high skill, and thus it cannot be said that all users can easily perform such modification. On the other hand, in a case where the company modifies the captured image acquired from the user, the company is required to ensure high security and perform strict business operation.

Further, the formats of the purchase history and the types of information included in the purchase history are different between EC companies, and there is no common rule between EC companies. Therefore, it is difficult to extract information for determining whether a predetermined product has been purchased by the user from a captured image of a purchase history of each EC company as described above, and check whether all pieces of information for determination is included in the captured image. In addition, when a plurality of products are purchased from an EC company, it is difficult to capture the information about these purchased products in one purchase history screen, and a user needs to repeat scrolling and capturing. In such a case, it is difficult for the user to check whether all pieces of information for determination are included in the plurality of captured images. In particular, the conditions for providing an incentive in sales promotion measures often include many items such as a target product (manufacturer, brand, content, type, etc.), purchase date, the number of purchased products, purchased amount of money, transaction status (payment status, delivery/cancellation/return status). Therefore, it is difficult to check whether the captured images include information about such many items. As a result, there may be cases where a captured image that does not include all of the information items for determination is sent. Therefore, even when the captured image is sent from a user, a company sometimes cannot determine whether the user satisfies the conditions and cannot provide an incentive.

Furthermore, since tools for editing digital image data have been widely used, it is possible for a user of a certain technical level to create/copy/alter images. Therefore, such a user can illegally create a purchase history image including an actual purchase and send it to a company even when the user did not make an actual purchase. However, it is very difficult to discriminate an image illegally created as described above on the company side.

Therefore, in view of the above situation, the present inventor has created an embodiment of the present disclosure capable of effectively implementing sales promotion measures for promoting product purchase via an EC company. The details of the embodiments of the present disclosure created by the present inventor will be successively described below.

Hereinafter, a case where an embodiment of the present disclosure is applied to measure, among sales promotion measures implemented by a company, of providing an incentive to a user who is determined to satisfy predetermined conditions based on purchase history information (hereinafter referred to as "purchase history") regarding a transaction (sales/purchase) performed between the user and an EC company will be described as an example.

Further, in the following, the purchase history will be described by taking as an example a purchase history provided to a user from an EC company via a website, an application, or the like, but the embodiment of the present disclosure is not limited to such a purchase history. For example, in the embodiment of the present disclosure, instead of the purchase history, a delivery statement sent from an EC company, an email for purchase confirmation, or the like may be used.

In the following description, unless otherwise specified, a user means a general consumer, and an EC company means a company that conducts electronic commerce with general consumers. In addition, a company means a company that manufactures or sells products and the like to general consumers using a site operated by an EC company, or a company has been entrusted with the implementation of sales promotion measures by the company.

2. Embodiment of the Present Disclosure

<2.1 Schematic Configuration of Information Processing System 10>

First, a schematic configuration of an information processing system 10 according to an embodiment of the present disclosure will be described with reference to FIG. 1. FIG. 1 is a system diagram illustrating a schematic configuration of the information processing system 10 according to the present embodiment of the present disclosure. As illustrated in FIG. 1, the information processing system 10 according to the present embodiment can include, for example, a user terminal 100, a determination server 200, and an EC company server 300. The user terminal 100, the determination server 200, and the EC company server 300 described above can communicate with each other via various wired or wireless communication networks 400. The number of the user terminals 100 and the number of the EC company servers 300 included in the information processing system 10 are not limited to the numbers illustrated in FIG. 1 and may be more than those. Hereinafter, each device included in the information processing system 10 according to the present embodiment will be described.

(User Terminal 100)

The user terminal 100 is a user terminal operated by a user, and can be, for example, a smartphone, a future phone, a tablet personal computer (PC), a smart watch, or the like. The user terminal 100 can, for example, perform a transaction of a product or a service with an EC company, that is, can conduct an electronic commerce with the EC company. Specifically, the user terminal 100 can conduct an electronic commerce via an EC site provided by an EC company according to a user operation or conduct an electronic commerce transmitting an email or the like to the EC company. For example, the EC site includes information such as a product code (for example, Japan Article Number (JAN) code etc.), product name, category, concept image, manufacturer information, distributor information and sales price as product information associated with a Uniform Resource Locator (URL) of the EC site. For example, a user browse the EC site through the user terminal 100 and performs a predetermined operation to transmit a purchase log to a server owned by the EC company, so that the user can conduct an electronic commerce with the EC company. The purchase log can include a product code of the purchased product, product name, purchase date and time, purchased amount of money, purchaser identification information (name, ID, etc.), payment means, destination information, EC site information, site browsing history, and the like.

Further, the user terminal 100 may have a function of communicating with a reader/writer (not illustrated), and in such a case, the user terminal 100 can function as payment means, a point card, or the like. More specifically, when the user terminal 100 is held over the reader/writer, information used for payment (electronic money balance, credit card number, and the like) or information about a point card (member ID, the number of accumulated points, update date and time, and the like) can be provided to the reader/writer. Note that the above functions are merely examples, and the user terminal 100 may appropriately have a function other than those described above. That is, the user terminal 100 may have a plurality of functions. The detailed configuration of the user terminal 100 will be described below.

(Determination Server 200)

The determination server 200 is a server that can communicate with the user terminal 100 described above, and is a computer that determines whether an electronic commerce conducted by a user satisfies the conditions for providing an incentive. Specifically, the determination server 200 can determine whether the above-described conditions are satisfied based on image data transmitted from the user terminal 100 and information acquired from the EC company server 300 managed by the EC company. The detailed configuration of the determination server 200 will be described below.

(EC Company Server 300)

The EC company server 300 is a computer managed by an EC company that manages information about an electronic commerce conducted between the EC company and users. In detail, the EC company server 300 includes a sales database (DB) (not illustrated) that stores information for conducting electronic commerce procedures through an EC site such as purchase logs transmitted from users and transaction status information (for example, payment status, delivery/cancellation/return status) associated with transaction identification information for identifying a transaction (for example, a transaction management number assigned to the transaction by the EC company, purchase number, delivery management number, and the like). Further, the EC company server 300 may store a product information database (DB) (not illustrated) that stores product information of products posted on the EC site provided to users. Here, the product information can be, for example, a product code, a product name, a category, a concept image, manufacturer information, distributor information, sales price information, and the like. The detailed configuration of the EC company server 300 will be described below.

In addition, in the present embodiment, each of the user terminal 100, the determination server 200, and the EC company server 300 does not have to be realized by a single device. For example, each of the user terminal 100, the determination server 200, and the EC company server 300 described above may be realized by a plurality of devices that are connected via the various wired or wireless communication networks 400 and cooperate with each other.

<2.2 Detailed Configuration of User Terminal 100>

Figure 2:
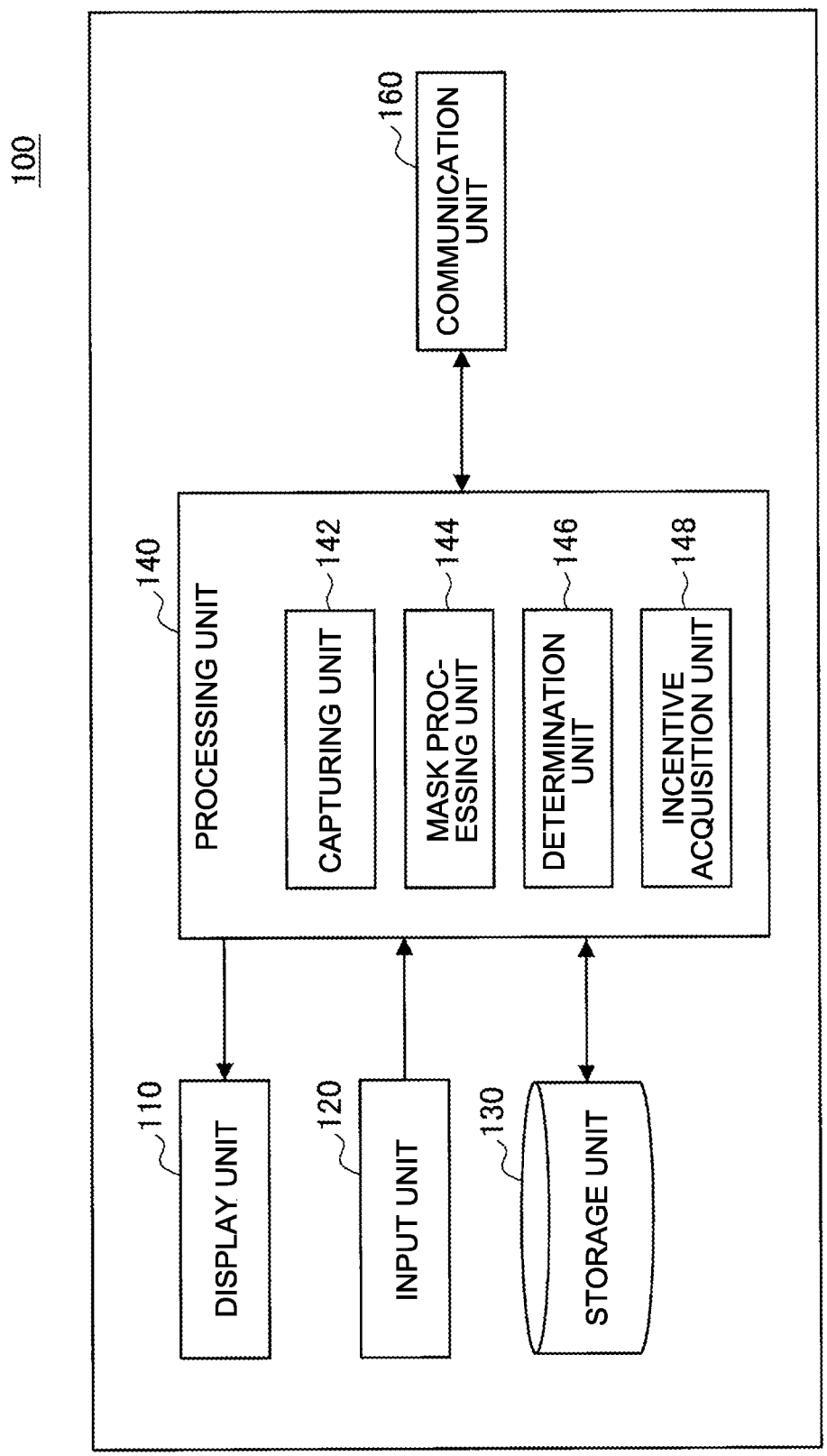
FIG. 2 is a diagram illustrating an example of functional blocks of a user terminal 100 according to the embodiment of the present disclosure.

The schematic configuration of the information processing system 10 according to the present embodiment has been described above. Next, detailed configurations of devices included in the information processing system 10 according to the present embodiment will be successively described. First, the detailed configuration of the user terminal 100 will be described with reference to FIG. 2. FIG. 2 is a diagram illustrating an example of functional blocks of the user terminal 100 according to the present embodiment.

As described above, the user terminal 100 according to the present embodiment can conduct an electronic commerce with an EC company. Specifically, as illustrated in FIG. 2, the user terminal 100 mainly includes a display unit 110, an input unit 120, a storage unit 130, a processing unit 140, and a communication unit 160. Hereinafter, functional blocks of the user terminal 100 will be successively described.

(Display Unit 110)

The display unit 110 is a display module including a display such as a liquid crystal display (LCD), an organic light emitting diode (OLED), or a cathode ray tube (CRT). The display unit 110 can be used, for example, to display an image of an EC site provided by an EC company. The display unit 110 does not have to be configured as a part of the user terminal 100, and for example, a display device connected to the user terminal 100 by wire or wirelessly may be treated as the display unit 110.

(Input Unit 120)

The input unit 120 receives an input of data and a command to the user terminal 100. More specifically, the input unit 120 is realized by a touch panel, a keyboard, or the like, and can receive an input operation from a user.

(Storage Unit 130)

The storage unit 130 is realized by a magnetic storage medium such as a hard disk (HD) provided in the user terminal 100, a non-volatile memory, or the like, and stores various types of information. For example, the storage unit 130 can store image data displayed and captured on the display unit 110 described above. Further, the storage unit 130 may store terminal identification information for identifying the user terminal 100 and various types of information used in a series of pieces of processing for payment (electronic money balance, credit card number, member ID, the number of accumulated points, update date and time, and the like), information of a received email, and the like. It should be noted that the various types of information described above are merely examples, and the storage unit 130 may store other types of information.

(Processing Unit 140)

For example, the processing unit 140 is realized by hardware such as a central processing unit (CPU), a read only memory (ROM), a random access memory (RAM), and the like provided in the user terminal 100, and performs various types of processing performed by the user terminal 100. As illustrated in FIG. 2, the processing unit 140 mainly includes a capturing unit (image capturing unit) 142, a mask processing unit 144, a determination unit 146, and an incentive acquisition unit 148. Each of the processing blocks included in the processing unit 140 will be described below.

—Capturing Unit 142—

The capturing unit 142 can capture an image displayed on the display unit 110 (for example, an image of a purchase history, a delivery statement, an email, or the like provided to a user by an EC company) and sore the captured image in the storage unit 130. Note that the capturing unit 142 captures an image of a resolution that allows predetermined information (such as transaction identification information) to be acquired from the captured image by optical character recognition (OCR). Further, the capturing unit 142 can acquire not only an image displayed on the display unit 110 but also the entire Web page or the entire email including the image displayed on the display unit 110 and can store the acquired image in the storage unit 130. Furthermore, the capturing unit 142 can also convert the entire Web page or the entire email to portable document format (PDF) and output the resultant as a PDF file. Note that the capturing unit 142 may transmit the captured image to the determination server 200 described below via the communication unit 160 described below.

—Mask Processing Unit 144—

The mask processing unit 144 performs image processing and OCR on the captured image, and identifies an area in which personal information (for example, a name, an address, identification information used between the user and an EC company, and the like) included in the purchase history is displayed based on predetermined processing conditions, which are set in advance for each EC company. Then, the mask processing unit 144 can perform mask processing for applying a mask of white, black, gray, or the like to the predetermined area, in which the personal information is displayed, in the captured image, or mosaic processing for applying a mosaic. Further, the processed captured image processed by the mask processing unit 144 is output to the determination unit 146 described below. In general, the number of EC companies used by users is limited, and thus it is considered that purchase history formats and pieces of information included in the purchase histories can be categorized by extracting some purchase histories provided by EC companies used by many users. Therefore, in the present embodiment, a predetermined area in which personal information is displayed can be accurately identified by grasping in advance formats of purchase histories of frequently used EC companies, categorizing them, and referring to the categorized formats.

In addition, the mask processing unit 144 can modify the mask processing or the mosaic processing performed on the processed captured image according to a user operation (specifically, change the position or range on which a mask is applied). In the present embodiment, the mask processing may be performed by the determination server 200 described below, and in this case, the mask processing unit 144 does not have to be provided in the processing unit 140. When the mask processing unit 144 performs the mask processing, it is possible to more effectively prevent leakage of the personal information of users.

—Determination Unit 146—

The determination unit 146 can determine whether the above-described processed captured image or the processed captured image modified by the user includes predetermined information (transaction identification information). Specifically, the determination unit 146 performs image processing and OCR on the processed captured image or the like, and extracts information displayed on the image based on the predetermined processing conditions set in advance for each EC company, so that the determination unit 146 can determine whether the image includes transaction identification information. As described above, in the present embodiment, it is possible to accurately determine whether the transaction identification information is included by referring to the categorized format described above. Here, the transaction identification information is information that can be used to identify an electronic commerce transaction conducted between a user and an EC company, and includes, for example, a transaction management number assigned by the EC company and a purchase number, a delivery management number, and the like.

Further, the determination unit 146 determines whether the transaction identification information is included, and may also determine whether transaction supplementary information about the transaction is included. Here, the transaction supplementary information may be information such as purchase date and time (transaction date), a product code (transaction product identification information), a purchased product name (transaction product name), purchased quantity (transaction quantity), a purchased amount of money (transaction amount of money), and a type of information can be set in advance by a company or the like. Further, when the determination unit 146 determines that the processed captured image or the like includes transaction identification information or transaction supplementary information, the determination unit 146 can transmit the processed captured image or the like to the determination server 200 via the communication unit 160. In addition, when the determination unit 146 determines that the processed captured image or the like does not include transaction identification information or transaction supplementary information, the determination unit 146 can output an alert to a user by displaying the alert on the display unit 110 or in other ways. In the present embodiment, the determination may be made by the determination server 200, and in this case, the determination unit 146 does not have to be provided in the processing unit 140.

—Incentive Acquisition Unit 148—

The incentive acquisition unit 148 can acquire information received from the determination server 200 via the communication unit 160 and provide an incentive to users based on the acquired information. Specifically, the incentive acquisition unit 148 can acquire information such as points and discount coupons that can be used for electronic payment, and output the fact that the incentive acquisition unit 148 acquired the information to a user via the display unit 110. Further, the incentive acquisition unit 148 may provide, via the display unit 110, a game that provides a user an opportunity to acquire points.

Note that the various processing contents described above are merely examples, and the processing unit 140 may perform other processing.

(Communication Unit 160)

The communication unit (transmission unit) 160 is realized, for example, by a communication device such as a communication antenna, a transmission/reception circuit, or a port, and can communicate with an external device such as the determination server 200. For example, the communication unit 160 can transmit a captured image or a processed captured image on which mask processing has been applied to the determination server 200. In addition, the communication unit 160 can also receive information about an incentive from the determination server 200. In addition, the communication unit 160 can also transmit and receive various types of information used in a series of series of pieces of processing. The various communication contents described above are merely examples, and the communication unit 160 may transmit and receive other types of information.

Note that the various functional blocks illustrated in FIG. 2 are merely examples, and the user terminal 100 may have other functional blocks not illustrated in FIG. 2.

<2.3 Detailed Configuration of Determination Server 200>

Figure 3:
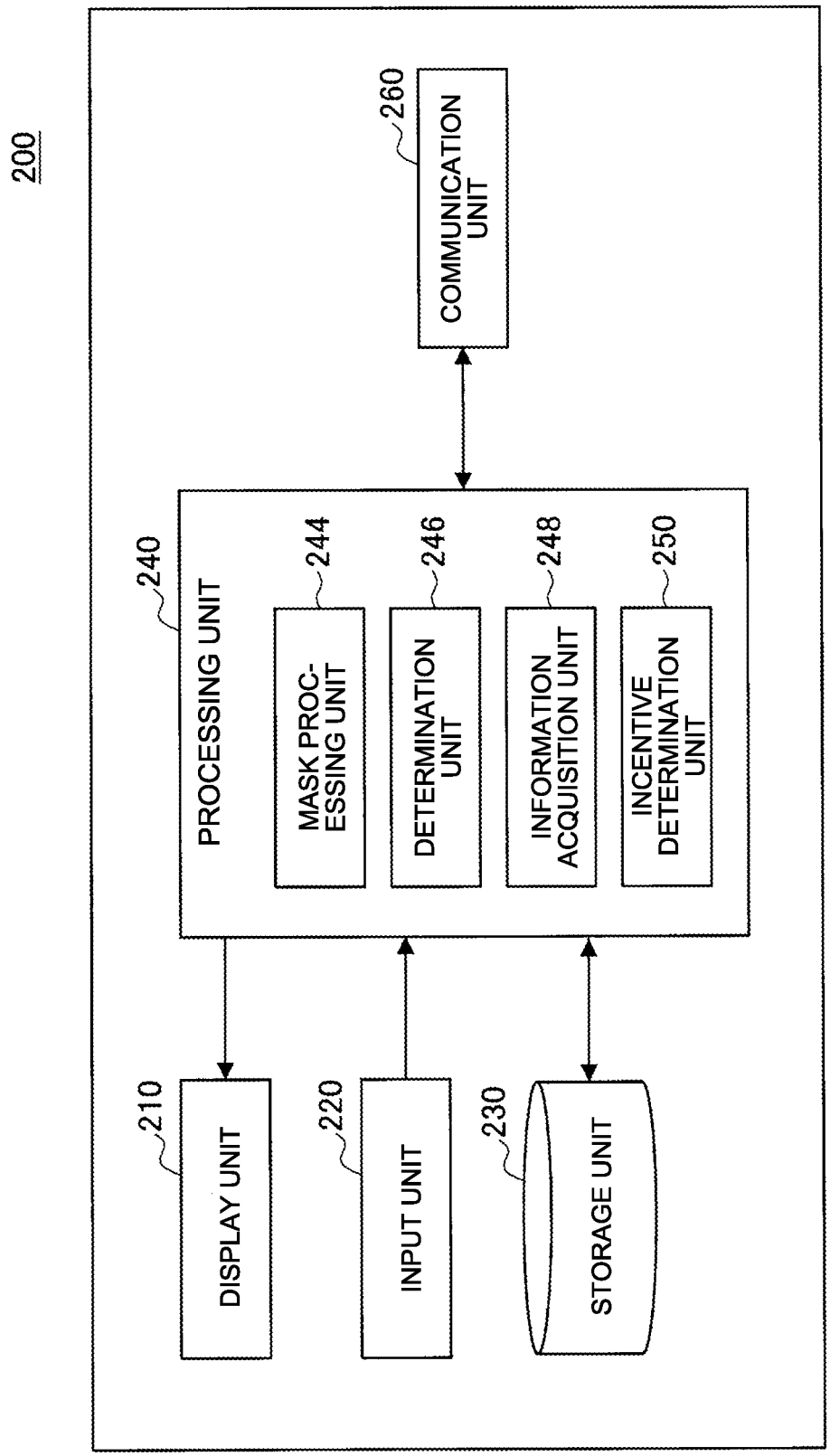
FIG. 3 is a diagram illustrating an example of functional blocks of a determination server 200 according to the embodiment of the present disclosure.

The detailed configuration of the user terminal 100 according to the present embodiment has been described above. Next, the detailed configuration of the determination server 200 according to the present embodiment will be described with reference to FIG. 3. FIG. 3 is a diagram illustrating an example of functional blocks of the determination server 200 according to the present embodiment. As described above, the determination server 200 according to the present embodiment is a computer that determines whether an electronic commerce conducted by a user satisfies the conditions for providing an incentive. Specifically, as illustrated in FIG. 3, the determination server 200 can mainly include a display unit 210, an input unit 220, a storage unit 230, a processing unit 240, and a communication unit 260. Hereinafter, functional blocks of the determination server 200 will be successively described.

(Display Unit 210)

The display unit 210 is a display module including a display such as an LCD, an OLED, or a CRT. The display unit 210 can display, for example, a setting screen 500 for setting in advance the data acquisition condition, which is the type of transaction information acquired from the EC company server 300, and conditions for providing an incentive (see FIG. 6). The display unit 210 does not have to be configured as a part of the determination server 200, and for example, a display device connected to the determination server 200 by wire or wirelessly may be treated as the display unit 210.

(Input Unit 220)

The input unit 220 receives input of data and a command to the determination server 200. More specifically, the input unit 220 is realized by a touch panel, a keyboard, or the like, and can receive inputs of various conditions from a company.

(Storage Unit 230)

The storage unit 230 is realized by, for example, a magnetic storage medium such as a hard disk provided in the determination server 200, a non-volatile memory, or the like, and stores a program or the like for the processing unit 240, which will be described below, to perform various types of processing, information acquired by the processing, the received information, and the like. For example, the storage unit 230 can store a processed captured image on which mask processing has been applied and transmitted from the user terminal 100, information about various conditions set in advance by a company, and the like. It should be noted that the various types of information described above are merely examples, and the storage unit 230 may store other types of information.

(Processing Unit 240)

The processing unit 240 is realized, for example, by hardware such as a CPU, a ROM, and a RAM provided in the determination server 200, and can perform various types of processing performed by the determination server 200. As illustrated in FIG. 3, the processing unit 240 mainly includes a mask processing unit 244, a determination unit 246, an information acquisition unit 248, and an incentive determination unit 250. Each of the processing blocks included in the processing unit 240 will be described below.

—Mask Processing Unit 244—

Similarly to the mask processing unit 144 described above, the mask processing unit 244 performs image processing and OCR on the captured image transmitted from the user terminal 100, and identifies an area in which personal information included in the purchase history is displayed based on predetermined processing conditions, which are set in advance for each EC company. Then, the mask processing unit 244 can perform mask processing for applying a mask of white, black, gray, or the like to the predetermined area, in which the personal information is displayed, in the captured image, or the like. Further, the processed captured image processed by the mask processing unit 244 is output to the determination unit 246 described below. In addition, similarly to the mask processing unit 144, the mask processing unit 244 can modify the mask processing or the mosaic processing performed on the processed captured image according to a user operation.

In the present embodiment, as described above, the mask processing may be performed by the user terminal 100, and in this case, the mask processing unit 244 does not have to be provided in the processing unit 240. Further, when the mask processing is performed on the determination server 200 side, a user checks the processed captured image before fixing, and fixes the processed captured image via the user terminal 100, and the fixed processed captured image is stored in the determination server 200. At this time, the captured image before the mask processing is deleted from the determination server 200. According to the present embodiment, such deletion can avoid leakage of personal information. Furthermore, according to the present embodiment, it is possible to prevent illegal creation/copy/alteration of a captured image by performing the mask processing on the determination server 200 side.

—Determination Unit 246—

The determination unit 246 can determine whether the above-described processed captured image or the processed captured image modified by the user includes transaction identification information. Specifically, the determination unit 246 performs image processing and OCR on the processed captured image or the like, and extracts information displayed on the image based on the predetermined processing conditions set in advance for each EC company, so that the determination unit 246 can determine whether the image includes transaction identification information. Further, the determination unit 246 determines whether the transaction identification information is included, and may also determine whether transaction supplementary information about the transaction is included. Further, when the determination unit 246 determines that the processed captured image or the like includes transaction identification information or transaction supplementary information, the determination unit 246 outputs the processed captured image or the like to the information acquisition unit 248. In addition, when the determination unit 246 determines that the processed captured image or the like does not include transaction identification information or transaction supplementary information, the determination unit 246 can output an alert to the user terminal 100 via the communication unit 260 described below. In the present embodiment, as described above, the determination may be performed by the user terminal 100, and in this case, the determination unit 246 does not have to be provided in the processing unit 240.

—Information Acquisition Unit 248—

The information acquisition unit 248 extracts transaction identification information and transaction supplementary information (predetermined information) from the processed captured image using OCR or the like, and transmits the extracted information together with information of requesting information type to the EC company server 300 described below via the communication unit 260 described below. Then, the information acquisition unit 248 acquires, based on the information transmitted by the information acquisition unit 248 itself, transaction information including a content of a transaction performed between the EC company and a user, which is transmitted by the EC company server 300. Further, the information acquisition unit 248 outputs the acquired transaction information to the incentive determination unit 250 described below.

Here, the information of information type requested by the information acquisition unit 248 is transaction information for determining whether the transaction of a user satisfies conditions for providing an incentive, and specifically, information such as a target product (manufacturer, brand, content, type, etc.), purchase date, the number of purchased products, purchased amount of money, transaction status (payment status, delivery/cancellation/return status). Since these types of transaction information are stored in the EC company server 300 in association with the transaction identification information, the information acquisition unit 248 can acquire the transaction information about a specific transaction by using the transaction identification information. It should be noted that the information acquisition unit 248 acquires, according to data acquisition conditions set by a company in advance, only information specified by the conditions from the EC company server 300. The processing contents described above are merely examples, and the information acquisition unit 248 may perform other processing.

—Incentive Determination Unit 250—

The incentive determination unit 250 can determine whether an electronic commerce conducted by a user satisfies conditions for providing an incentive referring to the conditions for providing an incentive set by the company in advance, and based on the transaction information acquired by the information acquisition unit 248 described above. Here, the conditions for providing an incentive in sales promotion measures include a plurality of items such as a target product (manufacturer, brand, content, type, etc.), target period, the number of purchased products, purchased amount of money, transaction status (payment status, delivery/cancellation/return status). Then, when an electronic commerce conducted by a user satisfies the condition for providing an incentive, the incentive determination unit 250 transmits information about provision of an incentive to the user terminal 100 via the communication unit 260 described below. Note that the processing contents described above are merely examples, and the incentive determination unit 250 may perform other processing.

(Communication Unit 260)

The communication unit (reception unit) 260 is realized, for example, by a communication device such as a transmission/reception circuit, or a port, and can communicate with an external device such as the user terminal 100 and the EC company server 300. For example, the communication unit 260 can receive a captured image or a processed captured image from the user terminal 100, and can also receive transaction information from the EC company server 300. The various communication contents described above are merely examples, and the communication unit 260 may communicate other types of information.

Note that the various functional blocks illustrated in FIG. 3 are merely examples, and the determination server 200 may have other functional blocks not illustrated in FIG. 3.

<2.4 Detailed Configuration of EC Company Server 300>

Figure 4:
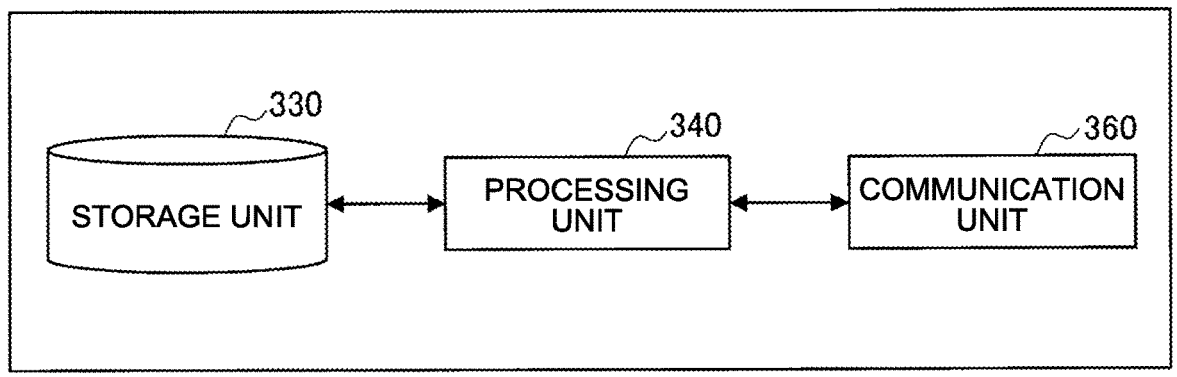
FIG. 4 is a diagram illustrating an example of functional blocks of an EC company server 300 according to the embodiment of the present disclosure.

The detailed configuration of the determination server 200 according to the present embodiment has been described above. Next, the detailed configuration of the EC company server 300 according to the present embodiment will be described with reference to FIG. 4. FIG. 4 is a diagram illustrating an example of functional blocks of an EC company server 300 according to the present embodiment. As described above, the EC company server 300 according to the present embodiment is a computer managed by an EC company and used by the EC company for an electronic commerce with a user. Specifically, as illustrated in FIG. 4, the EC company server 300 can mainly include a storage unit 330, a processing unit 340, and a communication unit 360. Hereinafter, functional blocks of the EC company server 300 will be successively described.

(Storage Unit 330)

The storage unit 330 is realized by, for example, a magnetic storage medium such as a hard disk provided in the EC company server 300 or the like, and stores a program or the like for the processing unit 340, which will be described below, to perform various types of processing, information acquired by the processing, the received information, and the like. For example, the storage unit 330 stores a sales DB including information for conducting an electronic commerce procedures through an EC site of an EC company or the like, end examples thereof include a sales log transmitted from a user, personal information of the user (a name, an address, identification information used between the user and an EC company, and the like), status information (payment status, delivery/cancellation/return status), and the like associated with transaction identification information. Further, the storage unit 330 stores a product information database (DB) (not illustrated) for managing product information of products posted on the EC site provided to users. Here, the product information includes a product code, a product name, a category, a concept image, manufacturer, distributor, sales price, and the like of a product posted on the EC site. It should be noted that the storage unit 330 the storage unit 330 may also store the various types of information described above are merely examples, and the storage unit 330 may store other types of information.

(Processing Unit 340)

The processing unit 340 is realized, for example, by hardware such as a CPU, a ROM, and a RAM provided in the EC company server 300, and performs various types of processing performed by the EC company server 300.

(Communication Unit 360)

The communication unit 360 is realized, for example, by a communication device such as a transmission/reception circuit, or a port, and can communicate with an external device such as the user terminal 100 and the determination server 200. For example, the communication unit 360 can transmit transaction information to the determination server 200 in response to a request from the determination server 200. The various communication contents described above are merely examples, and the communication unit 360 may communicate other types of information.

Specifically, the determination server 200 and the EC company server 300 described above can, using transaction identification information enabling identification of a transaction, transmit and receive transaction information of the transaction via an application programming interface (API), that is, an interface common to both of the determination server 200 and the EC company server 300, in other words, can cooperate. However, in the present embodiment, in order to ensure the security of the information stored in the EC company server 300, the above-mentioned cooperation may be realized by using the server identification information provided to the determination server 200 side. Further, in the present embodiment, in order to limit information that can be acquired by the determination server 200, the determination server 200 transmits transaction identification information for limiting transactions and a request according to data acquisition conditions for limiting types of transaction information to be acquired to the EC company server 300.

Note that the various functional blocks illustrated in FIG. 4 are merely examples, and the EC company server 300 may have other functional blocks not illustrated in FIG. 4.

<2.5 Information Processing Method>

Figure 5:
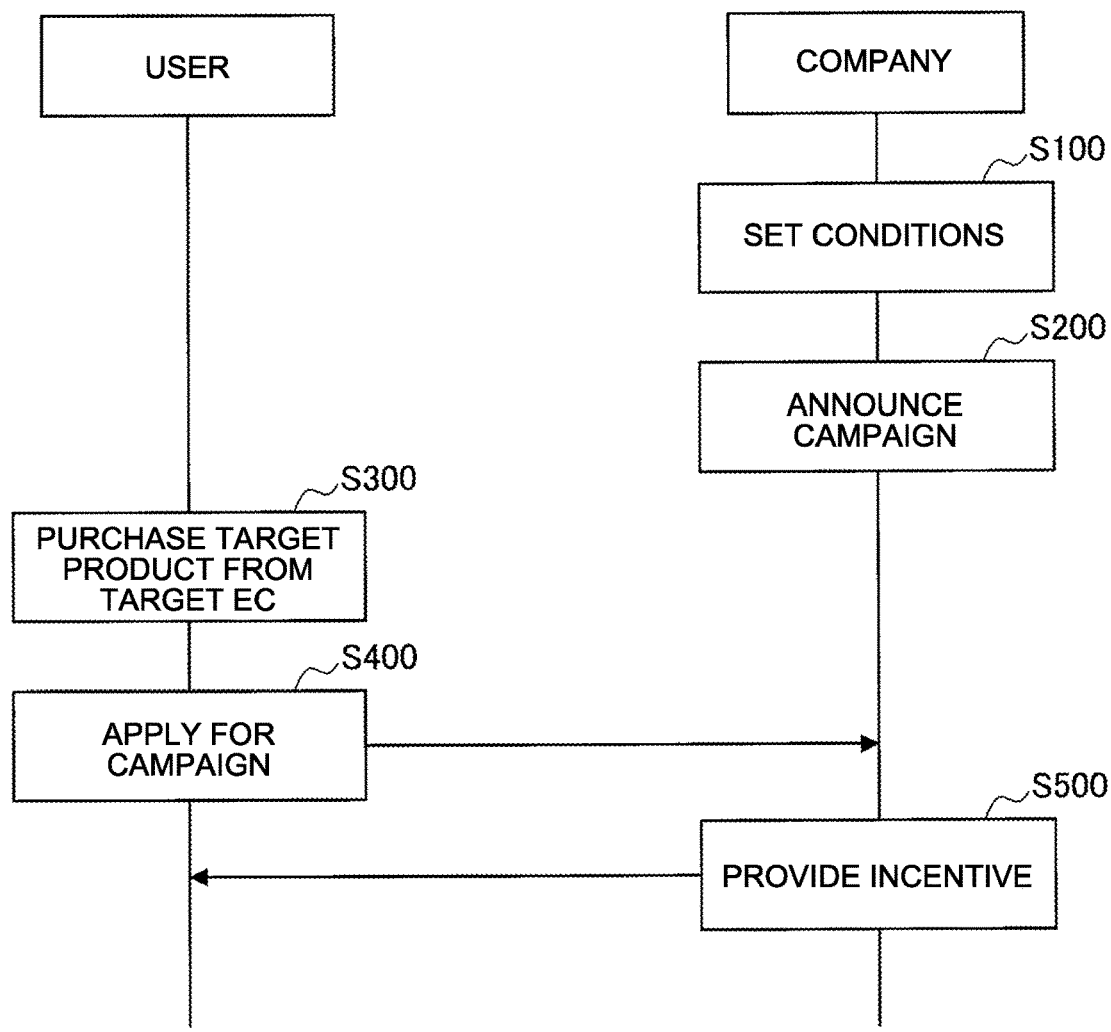
FIG. 5 is a sequence diagram illustrating a schematic flow of an information processing method according to the embodiment of the present disclosure.
Figure 7:
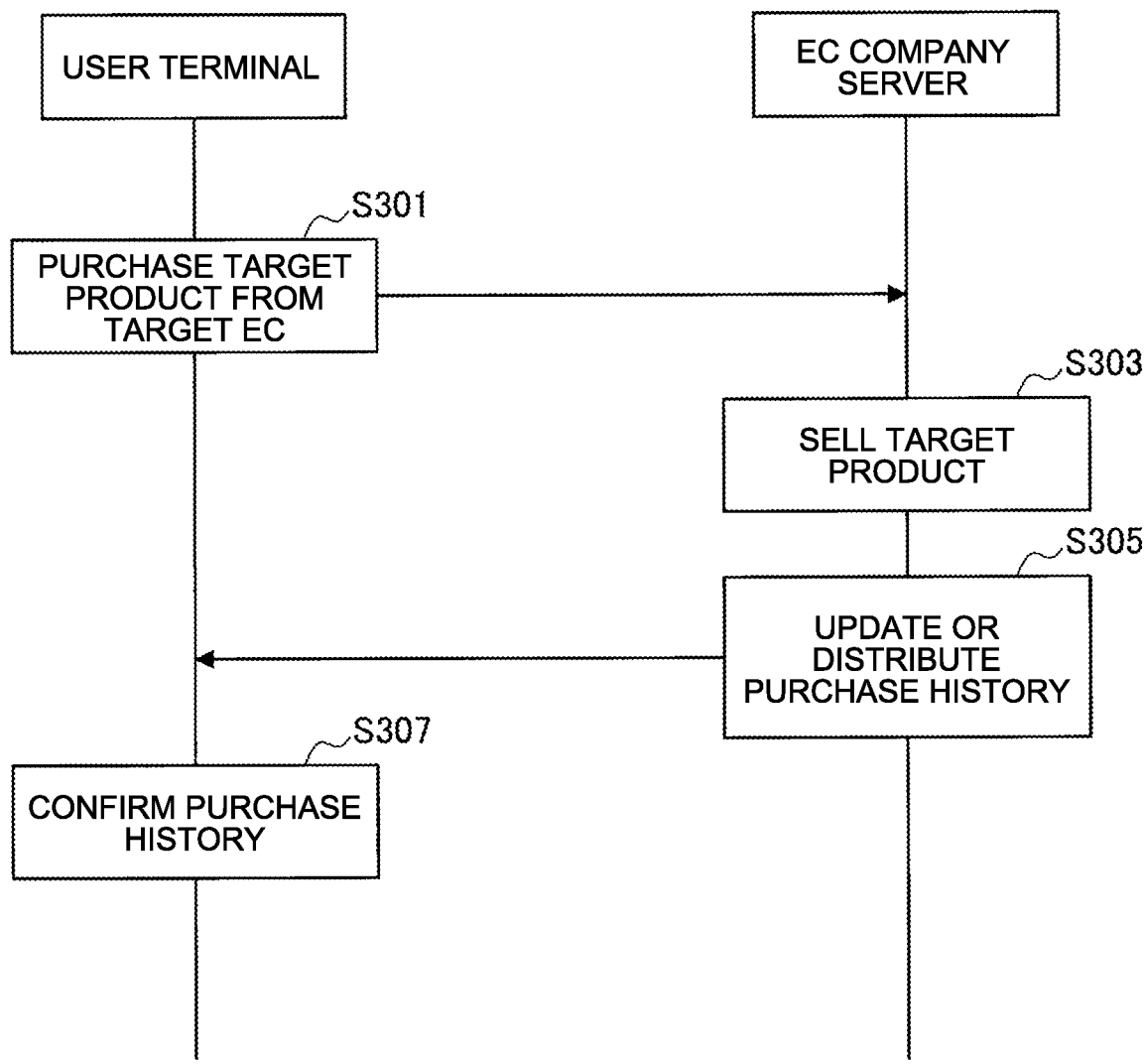
FIG. 7 is a sequence diagram illustrating an example of a flow of a purchase stage of the information processing method according to the embodiment of the present disclosure.
Figure 8:
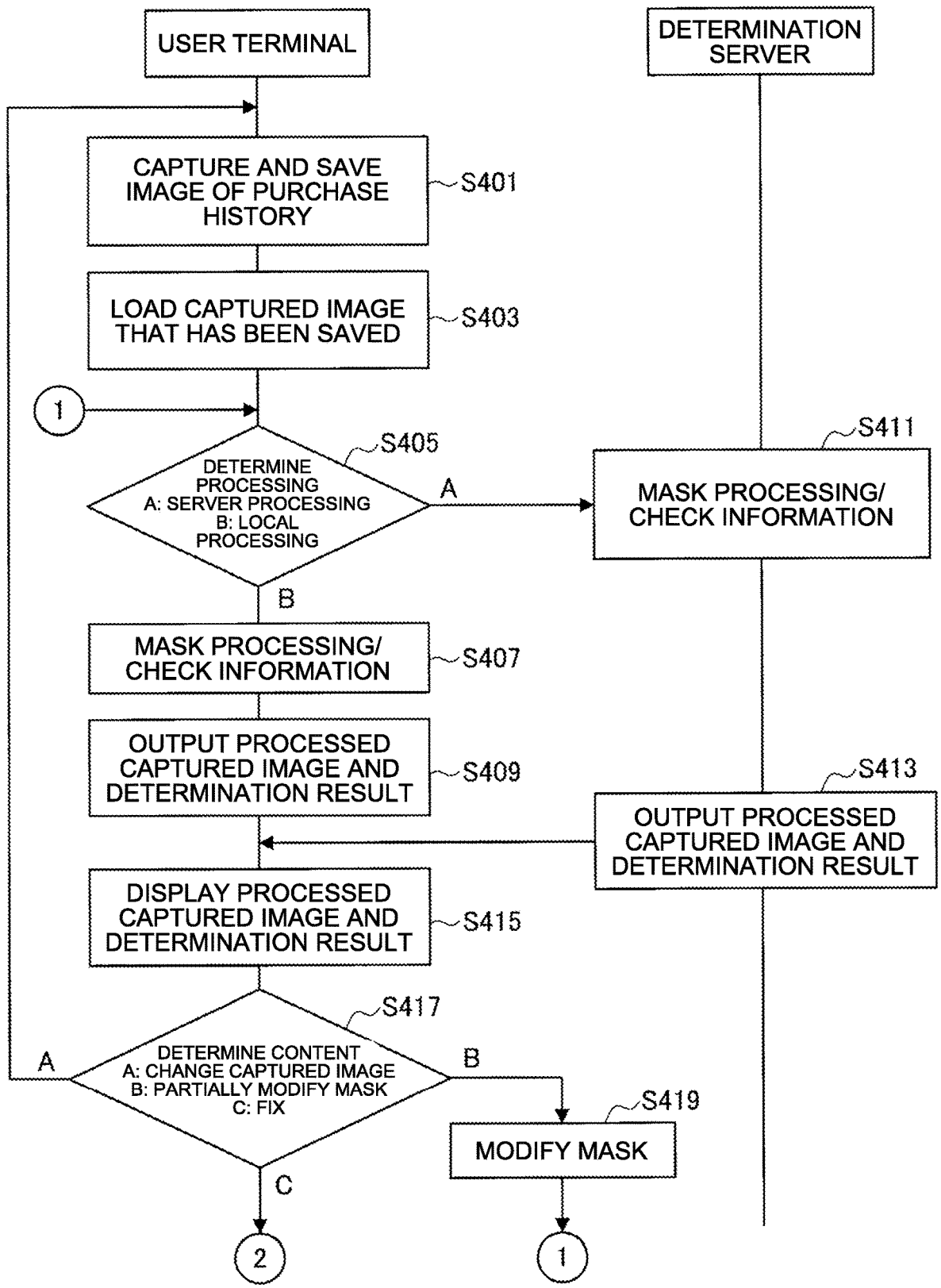
FIG. 8 is a sequence diagram (No. 1) illustrating an example of a flow of a campaign application stage of the information processing method according to the embodiment of the present disclosure.
Figure 9:
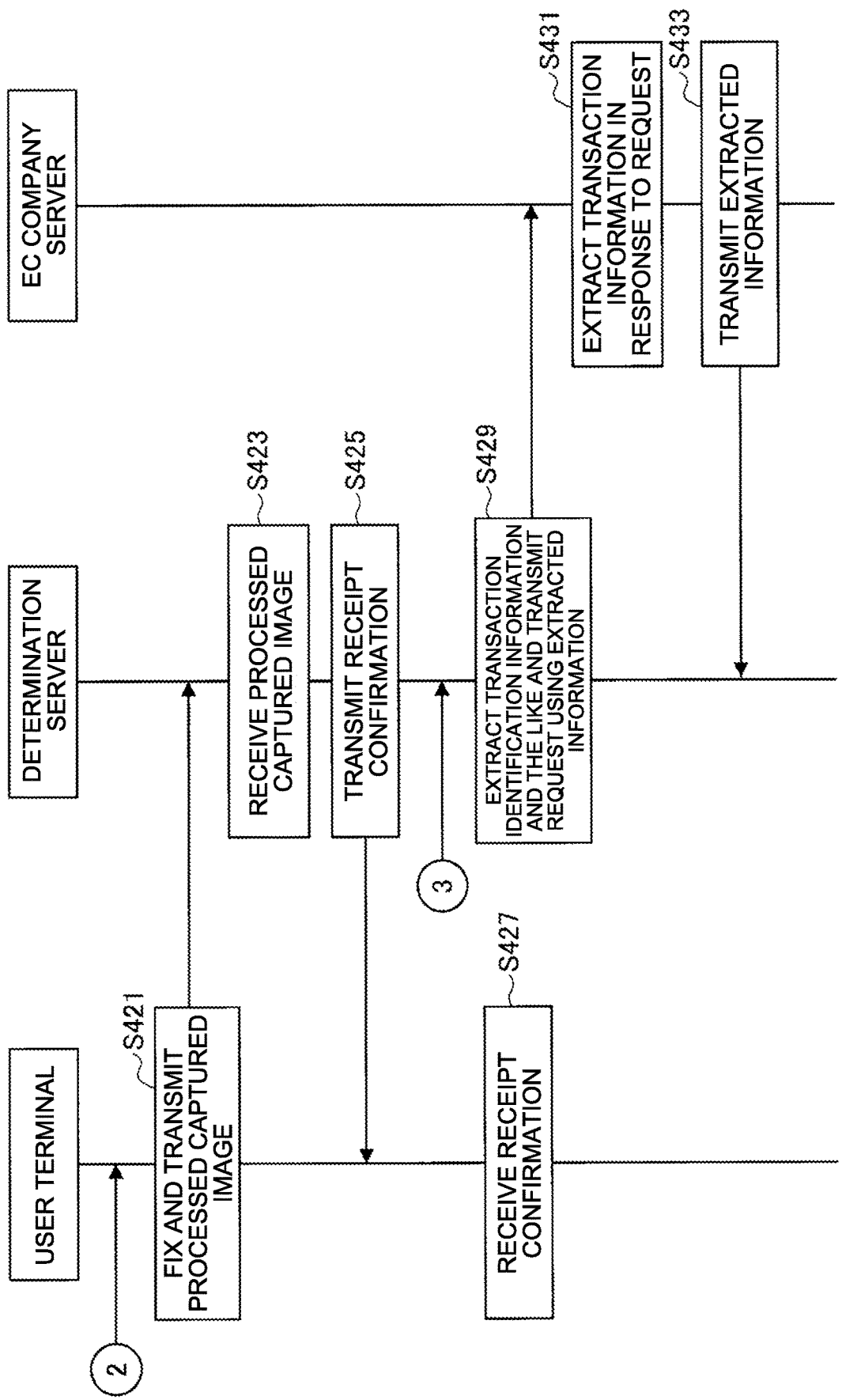
FIG. 9 is a sequence diagram (No. 2) illustrating an example of a flow of a campaign application stage of the information processing method according the embodiment of the present disclosure.
Figure 10:
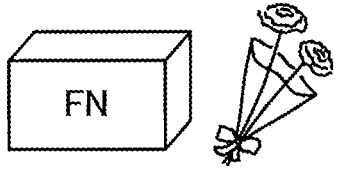
FIG. 10 is an explanatory diagram illustrating an example of a captured image 600a according to the embodiment of the present disclosure.
Figure 12:
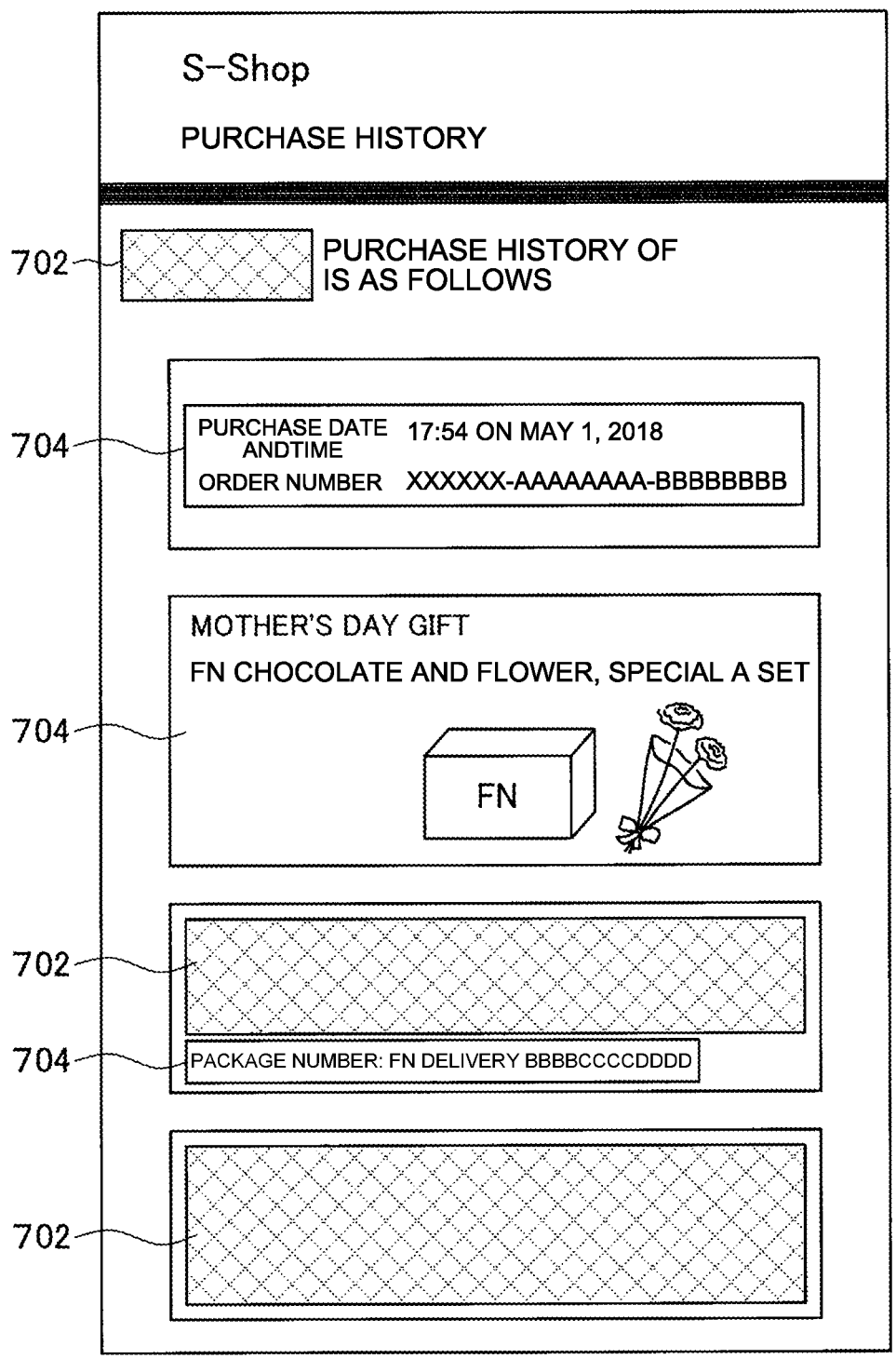
FIG. 12 is an explanatory diagram illustrating an example of a processed captured image 700 according to the embodiment of the present disclosure.
Figure 13:
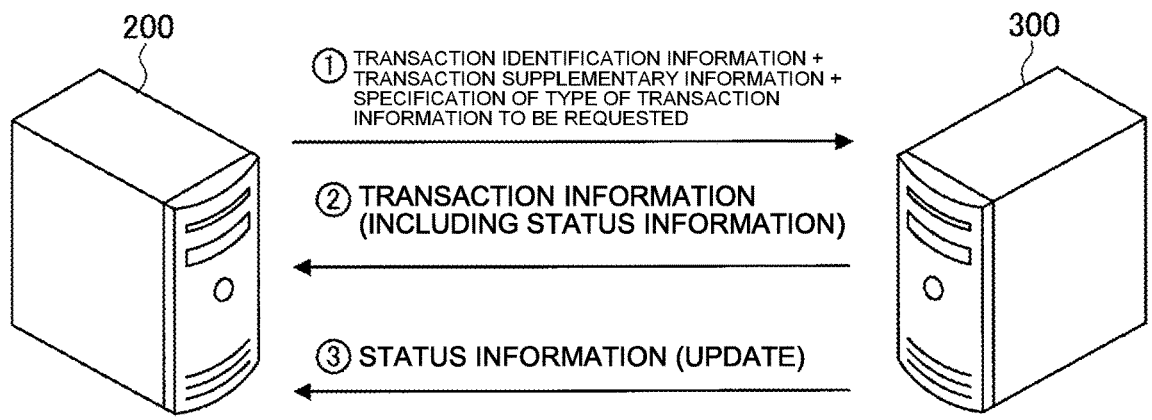
FIG. 13 is an explanatory diagram illustrating transmission/reception of information between the determination server 200 and the EC company server 300 according to the embodiment of the present disclosure.
Figure 14:
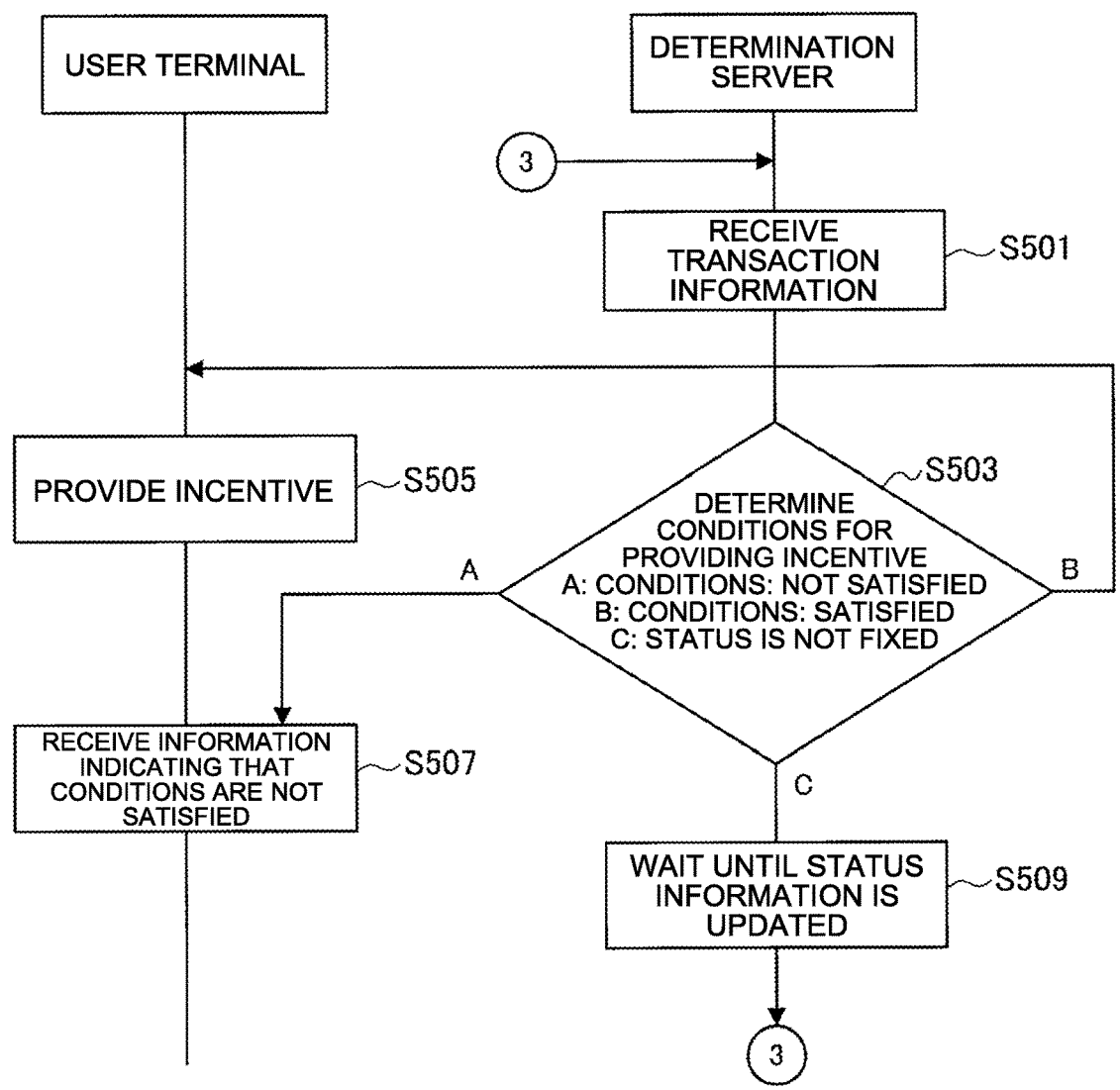
FIG. 14 is a sequence diagram illustrating an example of a flow of an incentive providing stage of the information processing method according to the embodiment of the present disclosure.

The detailed configuration of the EC company server 300 according to the present embodiment has been described above. Next, an information processing method according to the present embodiment will be described with reference to FIG. 5 to FIG. 14. Note that FIG. 5 is a sequence diagram illustrating a schematic flow of an information processing method according to the present embodiment. FIG. 6 is an explanatory diagram illustrating an example of the setting screen 500 according to the present embodiment. FIG. 7 is a sequence diagram illustrating an example of a flow of a purchase stage of the information processing method according to the present embodiment. FIGS. 8 and 92 are sequence diagrams illustrating an example of a flow of a campaign application stage of the information processing method according to the present embodiment. FIGS. 10 and 11 are explanatory diagrams illustrating an example of captured images 600*a* and 600*b* according to the present embodiment. FIG. 12 is an explanatory diagram illustrating an example of a processed captured image 700 according to the present embodiment. FIG. 13 is an explanatory diagram illustrating transmission/reception of information between the determination server 200 and the EC company server 300 according to the present embodiment. Further, FIG. 14 is a sequence diagram illustrating an example of a flow of an incentive providing stage of the information processing method according to the present embodiment.

(2.5.1 Outline of Information Processing Method)

First, a schematic flow of the information processing method according to the present embodiment will be described with reference to FIGS. 5 and 6. As illustrated in FIG. 5, the information processing method according to the present embodiment can mainly include a plurality of steps from step S100 to step S500. Details of each of these steps will be described below.

—Step S100—

The company sets data acquisition conditions and incentive providing conditions in advance. For example, the company can specify the information and conditions used for determination of incentive provision for each target EC company or each site of an EC company on the setting screen 500 illustrated in FIG. 6. As the conditions for providing an incentive, as illustrated in the upper part of FIG. 6, the company can set a target period, a target product (manufacturer, brand, content, type, product code, etc.), purchase count limit, purchased amount of money, the number of purchased products, limit of the number of provision target users, content of an incentive (points, etc.), a target EC company, and the like. In addition, user's name, user identification information for conducting a transaction with the EC company, an address, a telephone number, card information, or the like is not required to determine whether to provide an incentive. Therefore, in the present embodiment, conditions related to the status (payment status, delivery/cancellation/return status), a type of transaction information acquired from the EC company server 300 by the determination server 200, a type of information on which mask processing is performed, and the like are set in advance according to the incentive providing conditions set as described above based on the purchase history format and the like, which is grasped in advance for each EC company. Then, in the present embodiment, based on such settings, the mask processing can be performed on a captured image, and the determination server 200 can acquire specified transaction information from the EC company server 300. Note that, in the present embodiment, the setting screen 500 is not limited to the form illustrated in FIG. 6 and may have another form.

Note that standard settings may be entered in advance on the setting screen 500, and in this case, the company can easily set data acquisition condition and incentive providing conditions by modifying the standard setting as necessary.

Further, in the present embodiment, information type permitted to be provided to the determination server 200 may be set in advance on the user side using the user terminal 100 when applying for the incentive providing campaign. In such a case, for example, an application or the like installed in the user terminal 100 may automatically select an applicable campaign based on the information about information type permitted by the user, and display only information about the selected campaign.

As described above, in the present embodiment, the information on which mask processing is performed in the captured image can be appropriately set on the company side for each incentive providing condition or each EC company, and thus information can be appropriately masked to avoid leakage of personal information.

—Step S200—

The company announces the start of a campaign that provides an incentive according to the purchase of a specified product in an electronic commerce between the user and the EC company via an application or an advertisement site.

—Step S300—

The user checks the announced campaign on the application or the advertisement site, and purchases the target product from the EC company specified in the campaign. Note that, in the following description, step S300 calls the purchase stage, which will be described in detail below.

—Step S400—

The user applies for the campaign according to the announced campaign. In the following description, step S400 calls the application stage, which will be described in detail below.

—Step S500—

The company provides the user the incentive specified in the above-described campaign. Note that, in the following description, step S500 calls the incentive providing stage, which will be described in detail below.

(2.5.2 Purchase Stage)

The schematic flow of the information processing method according to the present embodiment has been described above. Next, details of the processing in the purchase stage (step S300), the application stage (step S400) and the incentive providing stage (step S500) included in the information processing method according to the present embodiment will be described. First, details of the processing at the purchase stage of the information processing method according to the present embodiment will be described with reference to FIG. 7. As illustrated in FIG. 7, the purchase stage according to the present embodiment may include a plurality of steps from step S301 to step S307. Details of each of these steps will be described below.

—Step S301—

The user purchases a target product via the user terminal 100 from the EC site of the EC company specified in the campaign. At this time, as described above, information such as a purchase log is transmitted from the user terminal 100 to the EC company server 300.

—Step S303—

The EC company performs processing for selling the target product to the user using the EC company server 300. In the present embodiment, on the EC company or the EC company server 300 side, the processing for the campaign (for example, determination, or provision of an incentive) is not performed.

—Step S305—

The EC company server updates or distributes the purchase history information to the user terminal 100 by updating the purchase history page, transmitting an email for purchase confirmation, or the like.

—Step S307—

The user confirms his or her own purchase history updated or distributed from the EC company server 300 via the user terminal 100.

(2.5.3 Application Stage)

The details of the processing in the purchase stage according to the present embodiment have been described above. Next, details of the processing at the application stage of the information processing method according to the present embodiment will be described with reference to FIGS. 8 to 13. As illustrated in FIGS. 8 and 9, the application stage according to the present embodiment can include a plurality of steps from step S401 to step S433. Details of each of these steps will be described below.

—Step S401—

The user captures and saves an image of his or her own purchase history using the user terminal 100 to apply for the campaign. In the present embodiment, the image of the purchase history is not captured automatically, but by the user's own operation, which can give the user a sense of security. Note that examples of the captured image of the purchase history can include the captured images 600*a* and 600*b* in FIG. 10 or 11. These captured images 600*a* and 600*b* each include transaction identification information (order number, etc.) assigned to the transaction by the EC company together with information such as information about the product purchased by the user, the purchased amount of money, the purchase date and time, the delivery address, the purchaser's name, the address, and the credit card number. Note that in the present embodiment, the captured images 600a and 600b are not limited to the forms illustrated in FIGS. 10 and 11. Further, in the present embodiment, the captured image is not limited to an image of the purchase history, and may be an image of the delivery statement sent to the user together with the product, or an image of an email sent from the EC company for purchase confirmation. Further, in the present embodiment, a captured image 600 may be an image of a screen on which a part of the purchase history is displayed, as the captured image 600b illustrated in FIG. 11. Since there may be a case where the captured image 600 does not include transaction identification information, in the present embodiment, in the step described below, it is determined whether the captured image 600 (specifically, the processed captured image 700) includes transaction identification information or the like.

—Step S403—

Using the user terminal 100, the user loads the captured image 600 saved in step S402 described above by using the website for campaign announcement or the application. At this time, the determination server 200 can automatically identify the campaign for which the user has applied based on information associated with the captured image 600 by the website or the application. In addition, at this time, the user can specify an EC company related to the purchase history of the captured image 600 by operating the website or the application. Further, if the user does not make such specification, the determination server 200 performs image processing or the like or OCR on the acquired captured image 600 to identify the EC company from the format of the captured image 600.

—Step S405—

The user terminal 100 determines whether the mask processing is performed by the user terminal 100 (local processing) or the determination server 200 (server processing). The determination may be made automatically, or may be made by user selection if processing on both sides is possible.

—Step S407—

The user terminal 100 performs image processing and OCR on the captured image 600, and identifies an area in which personal information included in the purchase history is displayed based on predetermined processing conditions, which are set in advance for each EC company. Then, the user terminal 100 performs mask processing for masking the area in which personal information is displayed. For example, as the processed captured image 700 illustrated in FIG. 11, an area in which personal information is displayed is automatically processed such that a mask 702 covers the area. According to the present embodiment, such processing can avoid leakage of personal information. In addition, in this step, as illustrated in the processed captured image 700 of FIG. 11, the mask processing is not performed on an area 704, in which transaction identification information (for example, order number) and transaction supplementary information (purchase date and time, product name, package number, etc.) are displayed. Note that, in the present embodiment, the processed captured image 700 is not limited to the form illustrated in FIG. 12.

Further, in this step, the user terminal 100 determines whether the processed captured image 700 includes transaction identification information and transaction supplementary information. Specifically, the user terminal 100 performs image processing and OCR on the processed captured image 700, and extracts information displayed on the processed captured image 700 based on the predetermined processing conditions set in advance for each EC company, which enables determination on whether the processed captured image 700 includes transaction identification information and the like.

—Step S409—

The user terminal 100 outputs the processed captured image 700 and the determination result obtained in step S407 described above. Here, the determination result is a result of determination on whether the processed captured image 700 includes transaction identification information and transaction supplementary information. Therefore, when it is determined that the processed captured image 700 does not include the transaction identification information or the transaction supplementary information, an alert is output to the user.

—Step S411—

The determination server 200 receives the captured image 600, and performs the mask processing for applying the mask 702 to the area in which the personal information of the captured image 600 is displayed similarly to step S407 described above. Here, the determination server 200 determines whether the processed captured image 700 includes transaction identification information and transaction supplementary information. In addition, in the present embodiment, the mask processing is performed by the determination server 200, so that it is possible to prevent the user from altering the purchase history or other operation.

—Step S413—

The determination server 200 outputs the processed captured image 700 and the determination result and transmits the processed captured image 700 and the determination result to the user terminal 100 similarly to step S409 described above. At this time, the received captured image 600 is deleted in the determination server 200.

—Step S415—

The user terminal 100 displays, to the user, the processed captured image 700 and the determination result output or transmitted in step S409 and step S413 described above (an alert when it is determined that the transaction identification information or transaction supplementary information is not included in the processed captured image 700).

—Step S417—

Based on the displayed processed captured image 700 and the determination result, the user selects either one of changing the captured image 600, modifying the mask 702, or fixing the displayed processed captured image 700 using the user terminal 100. When changing the captured image 600 is selected, the processing returns to step S401 described above, and when modifying the mask selected, the processing proceeds to step S419 described below. Further, when fixing the processed captured image 700 is selected, the processing proceeds to step S421 in FIG. 9. That is, in the present embodiment, when it is determined that the processed captured image 700 does not include the transaction identification information or the transaction supplementary information, it is possible to prompt the user to capture and save an image of the purchase history again by displaying an alert to the user. Furthermore, in the present embodiment, when the mask 702 does not properly mask or when information that the user does not want to transmit to the determination server 200 is included, the mask 702 can be modified by a user operation, so that leakage of personal information can be avoided.

—Step S419—

The mask 702 is modified by the user terminal 100 or cooperation of the user terminal 100 and the determination server 200. In detail, for example, the user adds the mask 702 by tracing a desired area of the displayed processed captured image 700 with a finger, or the user moves the mask 702 on the displayed processed captured image 700 with a finger, so that the user can modify the mask 702. When the mask processing ends, the user terminal 100 returns to step S405 described above.

—Step S421—

The user terminal 100 fixes the fixed processed captured image 700 and transmits the fixed processed captured image 700 to the determination server 200.

—Step S423—

The determination server 200 receives the fixed processed captured image 700 from the user terminal 100.

—Step S425—

The determination server 200 transmits, to the user terminal 100, a receipt confirmation that indicates the campaign application has been received from the user based on the reception of the processed captured image 700 fixed in step S423 described above.

—Step S427—

The user terminal 100 receives the above-described receipt confirmation from the determination server 200.

—Step S429—

The determination server 200 extracts transaction identification information and transaction supplementary information from the processed captured image received in above-described step S423 using OCR or the like, and transmits the extracted information together with information of the information type of requesting transaction information to the EC company server 300. At this time, the determination server 200 requests the transaction information from the EC company server 300 without using personal information, so that leakage of personal information can be avoided according to the present embodiment.

—Step S431—

In response to the request from the determination server 200, the EC company server 300 extracts information about a predetermined transaction content from a sales DB (not illustrated). The information extracted here is transaction information for determining whether the transaction of a user satisfies conditions for providing an incentive, and specifically, information such as a target product (manufacturer, brand, content, type, etc.), purchase date, the number of purchased products, purchased amount of money, transaction status (payment status, delivery/cancellation/return status). Since these types of transaction information are stored in the EC company server 300 in association with the transaction identification information described above, the EC company server 300 can extract the transaction information of a specific transaction by using the transaction identification information transmitted in step S429. Further, the EC company server 300 extracts only transaction information used to determine whether the transaction of the user satisfies the condition for providing an incentive, based on the information of the information type of the transaction information transmitted in step S429 described above. Since the conditions for providing incentives differ between campaigns, the pieces of transaction information used to determine whether to provide incentives often differ. However, in the present embodiment, the type of transaction information used to determine whether to provide an incentive is set in advance by the company who conducts the campaign, and the determination server 200 requests the EC company server 300 based on the setting. Therefore, the present embodiment can deal with various campaigns.

In the present embodiment, in order to ensure the validity of information transmission/reception between the determination server 200 and the EC company server 300, the EC company server 300 identifies and authenticates a transaction using transaction supplementary information such as purchase date and time, purchased amount of money and the like in addition to transaction identification information that uniquely identifies a transaction. That is, in the present embodiment, identification and authentication are performed using these plurality of pieces of information, and thus it is possible to prevent the transaction identification information from being altered.

—Step S433—

The EC company server 300 transmits the transaction information extracted in step S431 described above to the determination server 200. Information such as a target product, purchase date, the number of purchased products, purchased amount of money, and the like can be acquired immediately after the EC company performs processing of the sales, but status information (payment status, delivery status, cancellation status) varies with time, and there is a time lag before being fixed. Therefore, in the present embodiment, the status information may be transmitted from the EC company server 300 to the determination server 200 each time the information is updated, or the determination server 200 may request the status information from the EC company server 300 each time a predetermined time period (for example, one day, one week) elapses.

An example of the exchange of information transmitted and received in steps S429 to S433 described above is illustrated in FIG. 13. Further, as described above, the determination server 200 and the EC company server 300 can cooperate for transmission and reception of transaction information of a transaction using transaction identification information that enables identification of the transaction and transaction supplementary information via the API.

(2.5.4 Incentive Providing Stage)

The details of the processing in the application stage according to the present embodiment have been described above. Next, details of the processing at the incentive providing stage of the information processing method according to the present embodiment will be described with reference to FIG. 14. As illustrated in FIG. 14, the incentive providing stage according to the present embodiment can include a plurality of steps from step S501 to step S509. Details of each of these steps will be described below.

In the following, providing an incentive means providing points, discount coupons or the like that can be used for electronic payment, for example. However, in the present embodiment, the way of providing an incentive is not limited to providing an incentive described above, and may be, for example, providing chances of lottery games that determine the amount of points to be provided to the user.

—Step S501—

The determination server 200 receives the transaction information transmitted from the EC company server 300 in step S433 described above.

—Step S503—

The determination server 200 can determine whether an electronic commerce conducted by a user satisfies conditions for providing an incentive based on the transaction information received in step S501 described above referring to the conditions for providing an incentive set by the company in advance. If the conditions are satisfied, the determination server 200 proceeds to step S505 described below, and if the conditions are not satisfied, the determination server 200 proceeds to step S507 described below. Furthermore, when the status information is not fixed, the determination server 200 proceeds to step S509 described below.

—Step S505—

The determination server 200 transmits, to the user terminal 100, information indicating that the conditions for providing an incentive are satisfied and information about provision of an incentive (for example, information for performing point provision processing). Then, the user terminal 100 receives the information indicating that the conditions for providing the incentive are satisfied and the information about provision of an incentive, and receives the provision of the incentive. Then, the processing according to the present embodiment ends.

—Step S507—

The determination server 200 transmits, to the user terminal 100, information indicating that the conditions for providing an incentive are not satisfied. Then, the user terminal 100 receives the information that the conditions for providing the incentive are not satisfied, and ends the processing according to the present embodiment.

—Step S509—

The determination server 200 waits until the status information is updated by the EC company server 300. After that, the determination server 200 returns to step S501 and receives the updated status information from the EC company server 300. That is, in the present embodiment, the updated status information may be automatically transmitted from the EC company server 300 to the determination server 200 each time the information is updated, or the EC company server 300 may request the updated status information from the determination server 200 each time a predetermined time period (for example, one day, one week) elapses.

3. Conclusion

As described above, according to the embodiment of the present disclosure, it is possible to effectively implement sales promotion measures for promoting product purchase via an EC company while avoiding leakage of personal information.

Specifically, in the present embodiment, the mask processing is automatically performed on the area in which personal information of the captured image 600 of the purchase history is displayed, so that leakage of personal information can be avoided. In the present embodiment, the mask processing can be performed by either the user terminal 100 or the determination server 200. When the mask processing is performed as local processing by the user terminal 100, confidentiality is further enhanced, so that leakage of personal information can be more reliably avoided. On the other hand, when the mask processing is performed by the server processing of the determination server 200, advanced mask processing and reliable mask processing for the captured image 600 can be performed. In this case, it is preferable that the determination server 200 acquire the captured image 600 as primary data, check that there is no sign of processing such as alteration, and then perform the mask processing. According to the present embodiment, this processing can prevent alteration or the like of a purchase history.

In addition, in the present embodiment, the determination server 200 and the EC company server 300 are made to cooperate using the API and exchange transaction information used to determine whether a transaction of a user satisfies the conditions for providing an incentive without exchanging personal information or the like. In the present embodiment as described above, it is possible to take in a campaign of an external affiliate company or the like easily in a manner that the campaign contributes to the sales of each EC company. Further, according to the present embodiment, since the information such as purchased product of the user is extracted regardless of the EC company, EC company that uses advertisement promotion cost of the company as a fund is not limited, and in other words, it is possible to easily implement sales promotion measures (campaigns) collectively for a plurality of EC companies as a business. In addition, in the present embodiment, information managed by an EC company can be used, so that it is possible to suppress an increase in the introduction cost of the sales promotion measure implementation infrastructure on the company side.

Note that the history information according to the above-described embodiment of the present invention has been described by taking as an example a purchase history provided to a user from an EC company, but the embodiment of the present disclosure is not limited to such a purchase history. For example, the history information may be a delivery statement provided by an EC company, an email for purchase confirmation, or the like.

4. Hardware Configuration

Figure 15:
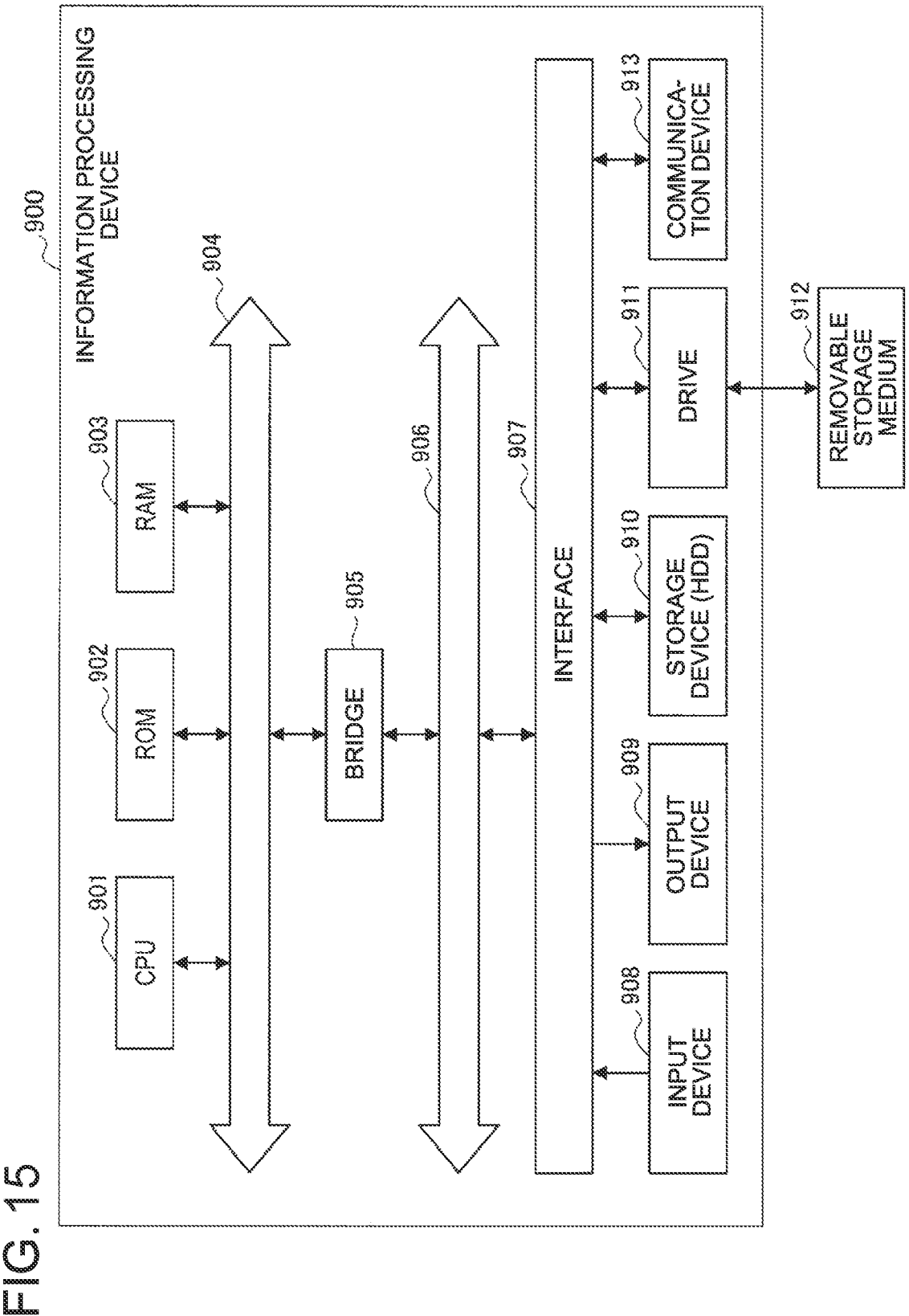
FIG. 15 is a block diagram for describing a hardware configuration of an information processing device 900 according to the embodiment of the present disclosure.

Next, a hardware configuration of the user terminal 100 according to the embodiment of the present disclosure will be described with reference to FIG. 15. FIG. 15 is a block diagram for describing a hardware configuration of the information processing device according to the embodiment of the present disclosure. An illustrated information processing device 900 can realize, for example, the user terminal 100 in the above-described embodiment.

The information processing device 900 includes a CPU 901, a ROM 902, a RAM 903, and a host bus 904. The information processing device 900 also includes a bridge 905, an external bus 906, an interface 907, an input device 908, an output device 909, a storage device 910, a drive 911, a removable storage medium 912, and a communication device 913.

The CPU 901 functions as an arithmetic processing device and a control device, and controls the entire operation or part of the operation of the information processing device 900 according to various programs stored in the ROM 902, the RAM 903, the storage device 910, or the removable storage medium 912. The ROM 902 stores a program product, calculation parameters, and the like used by the CPU 901. The RAM 903 temporarily stores the programs used in the execution of the CPU 901 and the parameters that suitably vary in this execution, and the like. The CPU 901, the ROM 902, and the RAM 903 are mutually connected through the host bus 904 composed of an internal bus such as CPU bus. Further, the host bus 904 is connected to the external bus 906 such as a peripheral component interconnect/interface (PCI) bus via the bridge 905. Note that the host bus 904, the bridge 905, and the external bus 906 are not necessarily configured separately and that these functions may be implemented by one bus.

The input device 908 is configured from, for example, input means whereby a user inputs information, such as a mouse, a keyboard, a touch panel, a button, a microphone, a switch, and a lever, and an input control circuit that generates an input signal on the basis of inputs by the user and that outputs the input signal to the CPU 901, and the like. The user operating the information processing device 900 can input various types of data or instruct a processing operation to the information processing device 900 by operating the input device 908. Note that, the input device 908 may be a remote control device that uses infrared rays or other radio waves, or an external connection device (not illustrated) such as a smart phone that supports a manipulation of the information processing device 900, for example.

The output device 909 is a device capable of visually or audibly reporting acquired information to the user. The output device 909 may be, for example, a display device such as an LCD, an organic electro-luminescence (EL) display, lamp, or an audio output device such as a speaker and a headphone. The output device 909 can output results, obtained by processing by the information processing device 900, in the form of picture that includes text, image, or the like, or in the form of sound that includes voice, audio data, or the like.

The storage device 910 is a data storage device as an example of a storage unit of the information processing device 900. The storage device 910 may include a storage medium, a storing device for storing data on the storage medium, a reading device for reading data from the storage medium, and a deletion device for deleting data stored on the storage medium, or the like. The storage device 910 is, for example, a magnetic storage device such as a hard disk drive (HDD), a semiconductor storage device, an optical storage device, or the like. The storage device 910 stores programs and various data executed by the CPU 901, various data acquired from the outside, and the like.

The drive 911 is a reader/writer for the removable storage medium 912 such as a magnetic disk, an optical disk, or a semiconductor memory, and is built in or externally attached to the information processing device 900. For example, the drive 911 reads the information stored in the attached removable storage medium 912, and outputs it to the RAM 903. The drive 911 also writes a record into the attached removable storage medium 912.

The communication device 913 is, for example, a communication interface typically composed of a communication device through which connection to a communication network is established, and the like. The communication device 913 may be, for example, a communication card for a wired or wireless local area network (LAN), a Bluetooth (registered trademark), or a wireless USB (WUSB). Further, a communication device 925 may be a router for optical communication, a router for asymmetric digital subscriber line (ADSL), a modem for various types of communication, or the like. The communication device 925 typically transmits/receives signal and so forth, to and from the Internet and other communication devices using a predetermined protocol such as TCP/IP. The communication network connected to the communication device 913 is a network connected by wire or wirelessly, and is, for example, the Internet, a home LAN, infrared communication, satellite communication, or the like.

An example of the hardware configuration of the information processing device 900 has been described above. The above-described components may be formed using universal members, or may be formed by hardware specific to the function of the respective components. Such a configuration can be appropriately changed depending on the technical level at the time of implementation.

5. Supplement

Note that the embodiment of the present disclosure described above may include, for example, an information processing method performed by the information processing device or the information processing system as described above, a program for causing the information processing device to function, and a non-transitory tangible medium storing the program. Further, the program may be distributed via a communication line (including wireless communication) such as the Internet.

In addition, the steps in the information processing method of the above-described embodiments may not be performed in the described order. For example, the steps may be performed in an order changed appropriately. In addition, the steps may be performed partially in parallel or individually instead of being processed in time series. Further, processing of the steps may not be performed according to the described method. For example, the steps may be performed according to another method by another functional unit, device, or the like.

The preferred embodiment of the present disclosure have been described above in detail with reference to the accompanying drawings, but the technical scope of the present disclosure is not limited to such examples. It is obvious that a person having an ordinary knowledge in the technical field of the present disclosure can arrive at various alterations or modifications within the scope of the technical idea described in the claims, and it is understood that these alterations or modifications also belong to the technical scope of the present disclosure.

Furthermore, the effects described in the present description are to be construed as merely descriptive or illustrative, and are not limitative. In other words, the technique according to the present disclosure can achieve, in addition to or instead of the above effects, other effects apparent to a person skilled in the art from the statement of the present description.

Note that the following configurations also fall within the technical scope of the present disclosure.

(1) An information processing device comprising:
a processing unit that performs mask processing or mosaic processing on a predetermined area of a captured image acquired by capturing at least one of a purchase history, a delivery statement, and an email provided to a user by at least one electronic commerce company; and
a determination unit that determines whether the captured image that has been processed includes predetermined information.

(2) The information processing device according to (1), wherein the processing unit performs mask processing or mosaic processing based on a predetermined processing condition set in advance for each of the electronic commerce companies.

(3) The information processing device according to (2), wherein the processing unit modifies or changes the mask processing or the mosaic processing according to an operation of the user.

(4) The information processing device according to any one of (1) to (3), wherein the determination unit determines whether the processed captured image includes the predetermined information based on a predetermined set condition that is set in advance.

(5) The information processing device according to (4), wherein the determination unit outputs an alert to the user when the determination unit determines that the processed captured image does not include the predetermined information.

(6) The information processing device according to any one of (1) to (5), wherein the predetermined information includes transaction identification information for identifying a transaction performed between the electronic commerce company and the user.

(7) The information processing device according to (6), wherein the predetermined information further includes transaction supplementary information about the transaction.

(8) The information processing device according to (7), wherein the transaction supplementary information includes at least one of transaction date, transaction product identification information, a transaction product name, a transaction quantity, and a transaction amount of money.

(9) The information processing device according to any one of (1) to (8), wherein the information processing device is a user terminal operated by the user.

(10) The information processing device according to (9), further comprising an image capturing unit capable of capturing at least one of the purchase history, the delivery statement, and the email.

(11) The information processing device according to (9) or (10), further comprising a transmission unit that transmits the processed captured image to a server.

(12) The information processing device according to any one of (1) to (8), wherein the information processing device is a server that can communicate with a user terminal operated by the user.

(13) The information processing device according to (12), further comprising a reception unit that receives the captured image from the user terminal.

(14) The information processing device according to any one of (11) to (13), further comprising an information acquisition unit that acquires the predetermined information from the processed captured image.

(15) The information processing device according to (14), wherein the information acquisition unit acquires transaction information including a content of transaction performed between the electronic commerce company and the user from another server managed by the electronic commerce company using the predetermined information that has been acquired.

(16) The information processing device according to (15), wherein the transaction information includes at least one of transaction date, transaction product identification information, a transaction product name, a transaction quantity, a transaction amount of money, and a transaction status.

(17) The information processing device according to (15) or (16), further comprising an incentive determination unit that determines whether to provide a predetermined incentive to the user based on the transaction information referring to a predetermined incentive providing condition that is set in advance.

(18) An information processing method comprising:
performing mask processing or mosaic processing on a predetermined area of a captured image acquired by capturing at least one of a purchase history, a delivery statement, and an email provided to a user by at least one electronic commerce company; and
determining whether the captured image that has been processed includes predetermined information.

REFERENCE SIGNS LIST

10 INFORMATION PROCESSING SYSTEM
100 USER TERMINAL
110, 210 DISPLAY UNIT
120, 220 INPUT UNIT
130, 230, 330 STORAGE UNIT
140, 240, 340 PROCESSING UNIT
142 CAPTURING UNIT
144, 244 MASK PROCESSING UNIT
146, 246 DETERMINATION UNIT
148 INCENTIVE ACQUISITION UNIT
160, 260, 360 COMMUNICATION UNIT
200 DETERMINATION SERVER
248 INFORMATION ACQUISITION UNIT
250 INCENTIVE DETERMINATION UNIT
300 EC COMPANY SERVER
400 COMMUNICATION NETWORK
500 SETTING SCREEN
600a, 600b CAPTURED IMAGE
700 PROCESSED CAPTURED IMAGE
702 MASK
704 AREA
900 INFORMATION PROCESSING DEVICE
901 CPU
902 ROM
903 RAM
904 HOST BUS
905 BRIDGE
906 EXTERNAL BUS
907 INTERFACE
908 INPUT DEVICE
909 OUTPUT DEICE
910 STORAGE DEVICE
911 DRIVE
912 REMOVABLE STORAGE MEDIUM
913 COMMUNICATION DEVICE

The invention claimed is:

1. An information processing device comprising:
a processing unit configured to perform mask processing or mosaic processing on a predetermined area of a captured image acquired by capturing at least one of a purchase history, a delivery statement, or an email provided to a user by at least one electronic commerce company; and
a determination unit configured to
determine whether the captured image that has been processed includes predetermined information, and
output an alert to the user when the determination unit determines that the processed captured image does not include the predetermined information,
wherein the processing unit and the determination unit are each implemented via at least one processor.

2. The information processing device according to claim 1, wherein the processing unit is further configured to perform mask processing or mosaic processing based on a predetermined processing condition set in advance for each of the electronic commerce companies.

3. The information processing device according to claim 2, wherein the processing unit is further configured to modify or change the mask processing or the mosaic processing according to an operation of the user.

4. The information processing device according to claim 1, wherein the determination unit is further configured to determine whether the processed captured image includes the predetermined information based on a predetermined set condition that is set in advance.

5. The information processing device according to claim 1, wherein the predetermined information includes transaction identification information for identifying a transaction performed between the electronic commerce company and the user.

6. The information processing device according to claim 5, wherein the predetermined information further includes transaction supplementary information about the transaction.

7. The information processing device according to claim 6, wherein the transaction supplementary information includes at least one of transaction date, transaction product identification information, a transaction product name, a transaction quantity, or a transaction amount of money.

8. The information processing device according to claim 1, wherein the information processing device is a user terminal operated by the user.

9. The information processing device according to claim 8, further comprising an image capturing unit configured to capture at least one of the purchase history, the delivery statement, or the email,
  wherein the image capturing unit is implemented via at least one processor.

10. The information processing device according to claim 8, further comprising a transmission unit configured to transmit the processed captured image to a server,
  wherein the transmission unit is implemented via at least one processor.

11. The information processing device according to claim 1, wherein the information processing device is a server that can communicate with a user terminal operated by the user.

12. The information processing device according to claim 11, further comprising a reception unit configured to receive the captured image from the user terminal,
  wherein the reception unit is implemented via at least one processor.

13. The information processing device according to claim 10, further comprising an information acquisition unit configured to acquire the predetermined information from the processed captured image,
  wherein the information acquisition unit is implemented via at least one processor.

14. The information processing device according to claim 13, wherein the information acquisition unit is further configured to acquire transaction information including a content of transaction performed between the electronic commerce company and the user from another server managed by the electronic commerce company using the predetermined information that has been acquired.

15. The information processing device according to claim 14, wherein the transaction information includes at least one of transaction date, transaction product identification information, a transaction product name, a transaction quantity, a transaction amount of money, or a transaction status.

16. The information processing device according to claim 14, further comprising an incentive determination unit configured to determine whether to provide a predetermined incentive to the user based on the transaction information referring to a predetermined incentive providing condition that is set in advance,
  wherein the incentive determination unit is implemented via at least one processor.

17. An information processing method comprising:
  performing mask processing or mosaic processing on a predetermined area of a captured image acquired by capturing at least one of a purchase history, a delivery statement, or an email provided to a user by at least one electronic commerce company;
  determining whether the captured image that has been processed includes predetermined information; and
  outputting an alert to the user when the determination of whether the captured image includes determined information determines that the processed captured image does not include the predetermined information.

18. A non-transitory computer-readable medium having embodied thereon a program, which when executed by a computer causes the computer to execute an information processing method, the method comprising:
  performing mask processing or mosaic processing on a predetermined area of a captured image acquired by capturing at least one of a purchase history, a delivery statement, or an email provided to a user by at least one electronic commerce company;
  determining whether the captured image that has been processed includes predetermined information; and
  outputting an alert to the user when the determination of whether the captured image includes determined information determines that the processed captured image does not include the predetermined information.

* * * * *